United States Patent
Tang et al.

(10) Patent No.: US 11,016,270 B2
(45) Date of Patent: May 25, 2021

(54) PHOTOGRAPHING OPTICAL LENS ASSEMBLY, IMAGING APPARATUS AND ELECTRONIC DEVICE

(71) Applicant: LARGAN PRECISION CO., LTD., Taichung (TW)

(72) Inventors: Hsiang-Chi Tang, Taichung (TW); Chun-Yen Chen, Taichung (TW); Hung-Shuo Chen, Taichung (TW); Wei-Yu Chen, Taichung (TW)

(73) Assignee: LARGAN PRECISION CO., LTD., Taichung (TW)

( * ) Notice: Subject to any disclaimer, the term of this patent is extended or adjusted under 35 U.S.C. 154(b) by 122 days.

(21) Appl. No.: 16/295,633

(22) Filed: Mar. 7, 2019

(65) Prior Publication Data

US 2019/0346663 A1 Nov. 14, 2019

(30) Foreign Application Priority Data

May 10, 2018 (TW) .................................. 107115983

(51) Int. Cl.
*G02B 9/64* (2006.01)
*G02B 13/00* (2006.01)

(52) U.S. Cl.
CPC ........... *G02B 13/0045* (2013.01); *G02B 9/64* (2013.01)

(58) Field of Classification Search
None
See application file for complete search history.

(56) References Cited

U.S. PATENT DOCUMENTS

| | | | |
|---|---|---|---|
| 9,671,591 B2 | 6/2017 | Chen | |
| 10,133,032 B2 | 11/2018 | Gong et al. | |
| 2015/0277083 A1 | 10/2015 | Chae | |
| 2018/0188484 A1 | 7/2018 | Gong et al. | |
| 2018/0188486 A1 | 7/2018 | Gong et al. | |
| 2018/0188501 A1* | 7/2018 | Lee | G02B 13/0065 |
| 2019/0056568 A1* | 2/2019 | Huang | G02B 9/64 |
| 2019/0285853 A1* | 9/2019 | Lin | G02B 9/64 |

FOREIGN PATENT DOCUMENTS

| | | |
|---|---|---|
| CN | 106896474 A | 6/2017 |
| CN | 106908931 A | 6/2017 |
| CN | 106908932 A | 6/2017 |

(Continued)

*Primary Examiner* — Darryl J Collins
(74) *Attorney, Agent, or Firm* — McClure, Qualey & Rodack, LLP

(57) ABSTRACT

A photographing optical lens assembly includes seven lens elements, which are, in order from an object side to an image side, a first lens element, a second lens element, a third lens element, a fourth lens element, a fifth lens element, a sixth lens element and a seventh lens element. The first lens element with positive refractive power has an object-side surface being convex in a paraxial region thereof and an image-side surface being concave in a paraxial region thereof. The second lens element has positive refractive power. The sixth lens element with positive refractive power has an image-side surface being convex in a paraxial region thereof. The seventh lens element with negative refractive power has an image-side surface being concave in a paraxial region thereof and including at least one convex critical point in an off-axis region thereof.

27 Claims, 24 Drawing Sheets

(56) References Cited

FOREIGN PATENT DOCUMENTS

| | | |
|---|---|---|
| CN | 107436481 A | 12/2017 |
| CN | 108037579 A | 5/2018 |
| CN | 108318998 A | 7/2018 |
| CN | 108445603 A | 8/2018 |
| JP | 2015-072402 A | 4/2015 |
| JP | 2015-072405 A | 4/2015 |
| WO | 2017/199633 A1 | 11/2017 |

* cited by examiner

PHOTOGRAPHING OPTICAL LENS ASSEMBLY, IMAGING APPARATUS AND ELECTRONIC DEVICE

RELATED APPLICATIONS

This application claims priority to Taiwan Application Serial Number 107115983, filed May 10, 2018, which is herein incorporated by reference.

BACKGROUND

Technical Field

The present disclosure relates to a photographing optical lens assembly and an imaging apparatus. More particularly, the present disclosure relates to a photographing optical lens assembly and an imaging apparatus with compact size applicable to electronic devices.

Description of Related Art

With recent technology of semiconductor process advances, performances of image sensors are enhanced, so that the smaller pixel size can be achieved. Therefore, optical lens assemblies with high image quality have become an indispensable part of many modern electronics. With rapid developments of technology, applications of electronic devices equipped with optical lens assemblies increase and there is a wide variety of requirements for optical lens assemblies. However, in a conventional optical lens assembly, it is hard to balance among image quality, photosensitivity, aperture size, volume or field of view. Thus, there is a demand for an optical lens assembly that meets the aforementioned needs.

SUMMARY

According to one aspect of the present disclosure, a photographing optical lens assembly includes seven lens elements, which are, in order from an object side to an image side, a first lens element, a second lens element, a third lens element, a fourth lens element, a fifth lens element, a sixth lens element and a seventh lens element. The first lens element with positive refractive power has an object-side surface being convex in a paraxial region thereof and an image-side surface being concave in a paraxial region thereof. The second lens element has positive refractive power. The sixth lens element with positive refractive power has an image-side surface being convex in a paraxial region thereof. The seventh lens element with negative refractive power has an image-side surface being concave in a paraxial region thereof and including at least one convex critical point in an off-axis region thereof. When a focal length of the photographing optical lens assembly is f, a focal length of the first lens element is f1, a focal length of the second lens element is f2, a focal length of the sixth lens element is f6, a curvature radius of an image-side surface of the fifth lens element is R10, an axial distance between the object-side surface of the first lens element and an image surface is TL, and a maximum image height of the photographing optical lens assembly is ImgH, the following conditions are satisfied:

$0.50<|f1/f2|<3.6;$ $0.375<f/R10;$ $0.20<f/f6;$ and $TL/ImgH<1.75.$

According to another aspect of the present disclosure, an imaging apparatus includes the photographing optical lens assembly of the aforementioned aspect and an image sensor, wherein the image sensor is disposed on the image surface of the photographing optical lens assembly.

According to another aspect of the present disclosure, an electronic device includes the imaging apparatus of the aforementioned aspect.

According to one aspect of the present disclosure, a photographing optical lens assembly includes seven lens elements, which are, in order from an object side to an image side, a first lens element, a second lens element, a third lens element, a fourth lens element, a fifth lens element, a sixth lens element and a seventh lens element. The first lens element with positive refractive power has an object-side surface being convex in a paraxial region thereof. The second lens element has positive refractive power. The sixth lens element with positive refractive power has an image-side surface being convex in a paraxial region thereof. The seventh lens element with negative refractive power has an image-side surface being concave in a paraxial region thereof and including at least one convex critical point in an off-axis region thereof. When a focal length of the photographing optical lens assembly is f, a focal length of the first lens element is f1, a focal length of the second lens element is f2, a focal length of the sixth lens element is f6, a curvature radius of the object-side surface of the first lens element is R1, a curvature radius of an object-side surface of the second lens element is R3, a curvature radius of an image-side surface of the fifth lens element is R10, an axial distance between the object-side surface of the first lens element and an image surface is TL, and a maximum image height of the photographing optical lens assembly is ImgH, the following conditions are satisfied:

$0.50<|f1/f2|<5.5;$ $0.375<f/R10;$ $0.20<f/f6;$ $TL/ImgH<1.75;$ and $|R1|/R3<1.33.$ According to another aspect of the present disclosure, an electronic device includes at least two imaging apparatuses, which include a first imaging apparatus and a second imaging apparatus, wherein the first imaging apparatus and the second imaging apparatus are both facing toward an object side, each of the first imaging apparatus and the second imaging apparatus has a single focal point. The first imaging apparatus includes a lens assembly and a first image sensor, the first image sensor is disposed on an image surface of the lens assembly, and the first imaging apparatus has a field of view between 25 degrees and 60 degrees. The second imaging apparatus includes the photographing optical lens assembly of the aforementioned aspect and a second image sensor, the second image sensor is disposed on the image surface of the photographing optical lens assembly, and the second imaging apparatus has a field of view between 70 degrees and 120 degrees.

BRIEF DESCRIPTION OF THE DRAWINGS

The present disclosure can be more fully understood by reading the following detailed description of the embodiment, with reference made to the accompanying drawings as follows.

DETAILED DESCRIPTION

Figure 1:
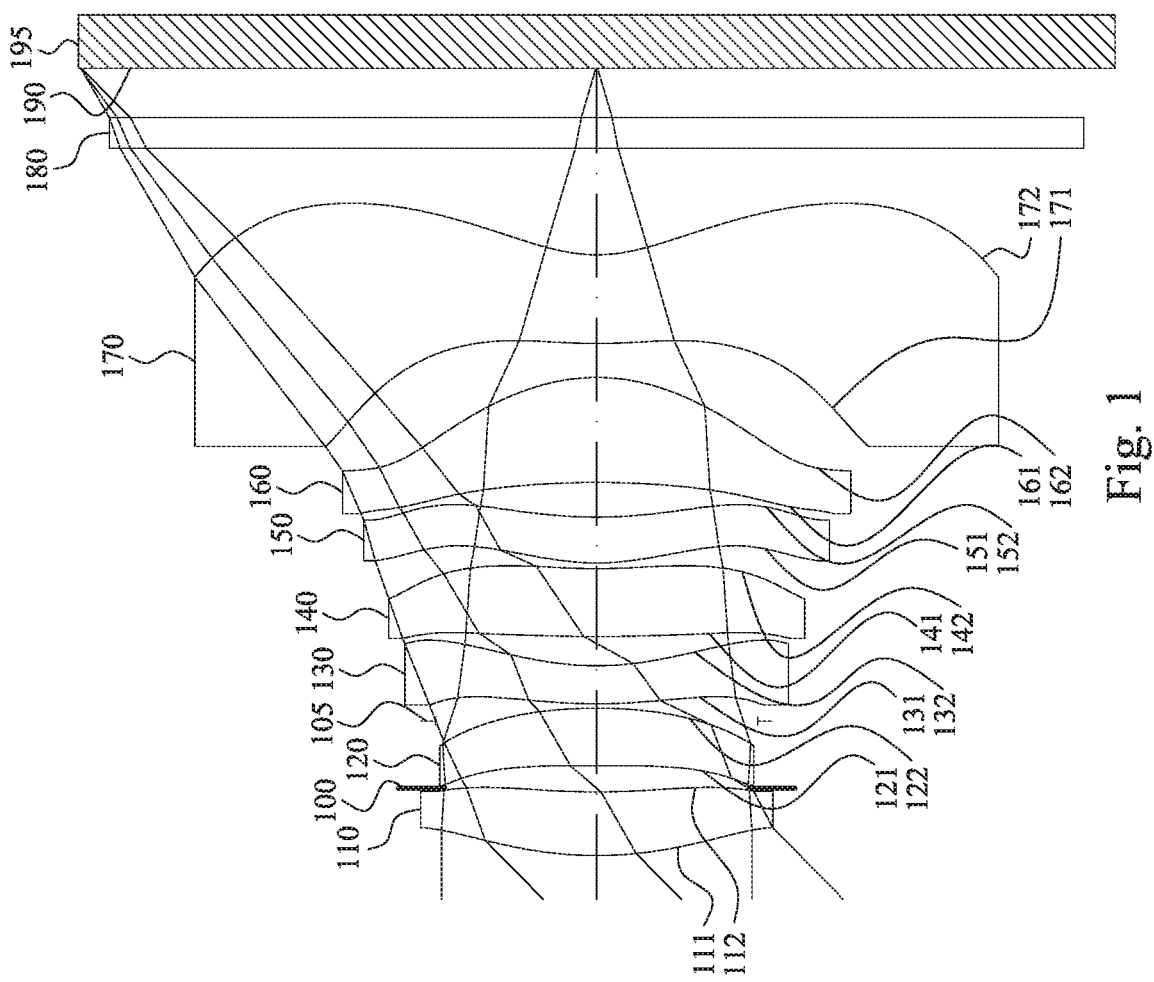
FIG. 1 is a schematic view of an imaging apparatus according to the 1st embodiment of the present disclosure.

A photographing optical lens assembly includes seven lens elements, which are, in order from an object side to an image side, a first lens element, a second lens element, a third lens element, a fourth lens element, a fifth lens element, a sixth lens element and a seventh lens element.

The first lens element with positive refractive power has an object-side surface being convex in a paraxial region thereof and an image-side surface being concave in a paraxial region thereof. Therefore, it is favorable for enlarging the field of view of the photographing optical lens assembly and decreasing the back focal length thereof.

The second lens element has positive refractive power, so that it is favorable for arranging stronger positive refractive power than the first lens element and allowing more light into the photographing optical lens assembly.

The third lens element can have negative refractive power, and can have an object-side surface being convex in a paraxial region thereof and an image-side surface being concave in a paraxial region thereof. Therefore, it is favorable for receiving the incident light with a large field of view and correcting aberrations.

The sixth lens element with positive refractive power has an image-side surface being convex in a paraxial region thereof. Therefore, it is favorable for image focusing on the image surface by providing sufficient refractive power.

The seventh lens element with negative refractive power has an image-side surface being concave in a paraxial region thereof. Therefore, it is favorable for correcting aberrations in the off-axis region. Furthermore, the image-side surface of the seventh lens element includes at least one convex critical point in an off-axis region thereof, so that it is favorable for enhancing the image quality in the off-axis region by effectively reducing the incident angle on the image surface.

When a focal length of the first lens element is f1, and a focal length of the second lens element is f2, the following condition is satisfied: $0.50 < |f1/f2| < 5.5$. Therefore, it is favorable for retrieving light with a large field of view in the photographing optical lens assembly by the arrangement of the shape of the first lens element, while avoiding the insufficient or excessive light by having the proper configuration between the refractive power of the first lens element and the second lens element. Moreover, the following condition can be satisfied: $0.50 < |f1/f2| < 3.6$. Moreover, the following condition can be satisfied: $0.60 < |f1/f2| < 1.90$. Furthermore, the following condition can be satisfied: $1.0 < |f1/f2| < 3.0$.

When the focal length of the photographing optical lens assembly is f, and a curvature radius of an image-side surface of the fifth lens element is R10, the following condition is satisfied: $0.375 < f/R10$. Therefore, it is favorable for reducing the back focal length by moving the exit pupil of the photographing optical lens assembly toward the object side so as to obtain compactness. Moreover, the following condition can be satisfied: $0.55 < f/R10 < 3.0$.

When the focal length of the photographing optical lens assembly is f, and a focal length of the sixth lens element is f6, the following condition is satisfied: $0.20 < f/f6$. Therefore, it is favorable for obtaining the sufficient refractive power of the lens elements on the image side with good image quality.

When an axial distance between the object-side surface of the first lens element and the image surface is TL, and a maximum image height of the photographing optical lens assembly is ImgH, the following condition is satisfied: TL/ImgH<1.75. Therefore, it is favorable for providing compactness by properly arranging the field of view and the total track length of the photographing optical lens assembly. Moreover, the following condition can be satisfied: 0.80<TL/ImgH<1.60. Furthermore, the following condition can be satisfied: 0.80<TL/ImgH<1.55.

When a curvature radius of the object-side surface of the first lens element is R1, and a curvature radius of an object-side surface of the second lens element is R3, the following condition is satisfied: |R1|/R3<1.33. Therefore, it is favorable for configuring the surface shapes between the first lens element and the second lens element. Moreover, the following condition can be satisfied: |R1|/R3<1.0.

When the focal length of the photographing optical lens assembly is f, and an entrance pupil diameter of the photographing optical lens assembly is EPD, the following condition is satisfied: 0.80<f/EPD<2.0. Therefore, it is favorable for increasing of the depth of field by enhancing the characteristic of a large aperture of the photographing optical lens assembly. Moreover, the following condition can be satisfied: 0.80<f/EPD<1.75.

When a maximum field of view of the photographing optical lens assembly is FOV, the following condition is satisfied: 70 degrees<FOV<140 degrees. Therefore, it is favorable for enhancing the characteristic of a large field of view of the photographing optical lens assembly.

When a curvature radius of an object-side surface of the sixth lens element is R11, and a curvature radius of the image-side surface of the sixth lens element is R12, the following condition is satisfied: 0<(R11+R12)/(R11−R12)<4.0. Therefore, it is favorable for avoiding image correcting problems due to the excessive variation of the refractive power of the lens elements on the image side by adjusting the surface shape and the refractive power of the sixth lens element. Moreover, the following condition can be satisfied: 0.50<(R11+R12)/(R11−R12)<3.0.

When an axial distance between the first lens element and the second lens element is T12, and an axial distance between a maximum effective radius position on the image-side surface of the first lens element and a maximum effective radius position on the object-side surface of the second lens element is ET12, the following condition is satisfied: 0.70<T12/ET12. Therefore, it is favorable for the off-axis light with a large field of view traveling into the photographing optical lens assembly so as to allow the off-axis light projecting onto the image surface by the lens elements on the image side by a proper distance between the off-axis regions of the first lens element and the second lens element.

When the focal length of the photographing optical lens assembly is f, a focal length of the third lens element is f3, a focal length of the fourth lens element is f4, and a focal length of the fifth lens element is f5, the following condition is satisfied: 0.75<|f/f3|+|f/f4|+|f/f5|<3.60. Therefore, it is favorable for providing sufficient refractive power from the third lens element, the fourth lens element and the fifth lens element to coordinate with the lens elements on the object side and the image side of the photographing optical lens assembly so as to enhance the correction of chromatic aberration and the illumination in the off-axis region, etc.

When a central thickness of the fourth lens element is CT4, and a central thickness of the fifth lens element is CT5, the following condition is satisfied: CT5/CT4<0.75. Therefore, it is favorable for providing the sufficient space for the fourth lens element and the fifth lens element so as to enhance the image quality in the off-axis region.

When a central thickness of the first lens element is CT1, and a central thickness of the second lens element is CT2, the following condition is satisfied: 0.80<CT2/CT1. Therefore, it is favorable for pairing the shapes of the first lens element and the second lens element.

When a sum of central thicknesses of all lens elements of the photographing optical lens assembly is ΣCT, and a sum of all axial distances between adjacent lens elements of the photographing optical lens assembly is ΣAT, the following condition is satisfied: 1.0<ΣCT/ΣAT. Therefore, it is favorable for avoiding overly large gaps between adjacent lens elements which underutilize the space configuration and make miniaturization harder to achieve.

When a maximum refractive index of a lens element of the optical photographing lens assembly is Nmax, the following condition is satisfied: 1.650≤Nmax<1.720. Therefore, it is favorable for enhancing the reduction of chromatic aberration of the photographing optical lens assembly so as to enhance the image quality, especially the image quality in the off-axis region.

When the focal length of the photographing optical lens assembly is f, a focal length of the sixth lens element is f6, and a focal length of the seventh lens element is f7, the following condition is satisfied: 2.0<|f/f6|+|f/f7|<6.0. Therefore, it is favorable for maintaining good image quality by obtaining sufficient refractive power of the lens elements on the image side.

When an Abbe number of the third lens element is V3, an Abbe number of the fourth lens element is V4, and an Abbe number of the fifth lens element is V5, the following condition is satisfied: 40<V3+V4+V5<120. Therefore, it is favorable for improving the image quality by enhancing the reduction of chromatic aberration of the photographing optical lens assembly.

When the focal length of the sixth lens element is f6, and the focal length of the seventh lens element is f7, the following condition is satisfied: |f7/f6|<1.0. Therefore, it is favorable for obtaining balanced refractive power of the lens elements on the image side.

When the focal length of the fourth lens element is f4, and the focal length of the sixth lens element is f6, the following condition is satisfied: |f6/f4|<1.0. Therefore, it is favorable for obtaining sufficient refractive power of the lens elements on the image side with good image quality.

When the focal length of the fifth lens element is f5, and the focal length of the sixth lens element is f6, the following condition is satisfied: |f6/f5|<1.0. Therefore, it is favorable for obtaining proper refractive power among the lens elements on the image side.

When the central thickness of the second lens element is CT2, a central thickness of the third lens element is CT3, the central thickness of the fifth lens element is CT5, and a central thickness of the sixth lens element is CT6, the following condition is satisfied: 1.75<(CT2+CT6)/(CT3+CT5). Therefore, it is favorable for balancing the thickness of each lens element with higher manufacturability.

When the focal length of the second lens element is f2, and the focal length of the third lens element is f3, the following condition is satisfied: |f2/f3|<1.0. Therefore, it is favorable for arranging sufficient refractive power of the second lens element so as to allow more light converging on the image surface.

When the focal length of the first lens element is f1, and the focal length of the third lens element is f3, the following condition is satisfied: |f3/f1|<1.0. Therefore, it is favorable for providing good image quality by arranging sufficient refractive power of the third lens element.

When the axial distance between the object-side surface of the first lens element and the image surface is TL, and the entrance pupil diameter of the photographing optical lens assembly is EPD, the following condition is satisfied: 1.40<TL/EPD<2.75. Therefore, it is favorable for balancing between miniaturization and obtaining a large aperture of the photographing optical lens assembly.

When a total number of the lens elements having Abbe numbers less than 20 is V20, the following condition is satisfied: 1 V20. Therefore, it is favorable for enhancing the reduction of chromatic aberration of the photographing optical lens assembly so as to enhance the image quality, especially the image quality in the off-axis region.

Each of the aforementioned features of the photographing optical lens assembly can be utilized in various combinations for achieving the corresponding effects.

According to the photographing optical lens assembly of the present disclosure, the lens elements thereof can be made of glass or plastic materials. When the lens elements are made of glass materials, the distribution of the refractive power of the photographing optical lens assembly may be more flexible to design. The glass lens element can either be made by grinding or molding. When the lens elements are made of plastic materials, manufacturing costs can be effectively reduced. Furthermore, surfaces of each lens element can be arranged to be aspheric (ASP), since the aspheric surface of the lens element is easy to form a shape other than a spherical surface so as to have more controllable variables for eliminating aberrations thereof, and to further decrease the required amount of lens elements in the photographing optical lens assembly. Therefore, the total track length of the photographing optical lens assembly can also be reduced. The aspheric surfaces may be formed by plastic injection molding or glass molding.

According to the photographing optical lens assembly of the present disclosure, when a surface of a lens element is aspheric, it indicates that the complete optical effective area or a partial of the optical effective area of the surface of the lens element can be aspheric.

According to the photographing optical lens assembly of the present disclosure, each of an object-side surface and an image-side surface has a paraxial region and an off-axis region. The paraxial region refers to the region of the surface where light rays travel close to an optical axis, and the off-axis region refers to the region of the surface away from the paraxial region. Particularly unless otherwise stated, when the lens element has a convex surface, it indicates that the surface can be convex in the paraxial region thereof; when the lens element has a concave surface, it indicates that the surface can be concave in the paraxial region thereof. According to the photographing optical lens assembly of the present disclosure, the refractive power or the focal length of a lens element being positive or negative may refer to the refractive power or the focal length in a paraxial region of the lens element.

According to the photographing optical lens assembly of the present disclosure, a critical point is a non-axial point of the lens surface where its tangent is perpendicular to the optical axis.

According to the photographing optical lens assembly of the present disclosure, the image surface of the photographing optical lens assembly, based on the corresponding image sensor, can be flat or curved. In particular, the image surface can be a concave curved surface facing towards the object side. According to the photographing optical lens assembly of the present disclosure, at least one image correcting element (such as a field flattener) can be selectively disposed between the lens element closest to the image side of the photographing optical lens assembly and the image surface so as to correct the image (such as the field curvature). Properties of the image correcting element, such as curvature, thickness, refractive index, position, surface shape (convex/concave, spherical/aspheric/diffractive/Fresnel etc.) can be adjusted according to the requirements of the imaging apparatus. In general, the image correcting element is preferably a thin plano-concave element having a concave surface toward the object side and is disposed close to the image surface.

According to the photographing optical lens assembly of the present disclosure, the photographing optical lens assembly can include at least one stop, such as an aperture stop, a glare stop or a field stop. Said glare stop or said field stop is for eliminating the stray light and thereby improving the image resolution thereof.

According to the photographing optical lens assembly of the present disclosure, an aperture stop can be configured as a front stop or a middle stop. A front stop disposed between an object and the first lens element can provide a longer distance between an exit pupil of the photographing optical lens assembly and the image surface, and thereby obtains a telecentric effect and improves the image-sensing efficiency of the image sensor, such as CCD or CMOS. A middle stop disposed between the first lens element and the image surface is favorable for enlarging the field of view of the photographing optical lens assembly and thereby provides a wider field of view for the same.

According to the photographing optical lens assembly of the present disclosure, an aperture adjusting unit can be properly configured. The aperture adjusting unit can be a mechanical part or a light control part, and the dimension and the shape of the aperture adjusting unit can be electrically controlled. The mechanical part can include a moveable component such a blade group or a shielding plate. The light control part can include a screen component such as a light filter, an electrochromic material, a liquid crystal layer or the like. The amount of incoming light or the exposure time of the image can be controlled by the aperture adjusting unit to enhance the image moderation ability. In addition, the aperture adjusting unit can be the aperture stop of the photographing optical lens assembly according to the present disclosure, so as to moderate the image properties by changing f-number to control the depth of field or the exposure speed.

According to the photographing optical lens assembly of the present disclosure, the photographing optical lens assembly can be applied to 3D (three-dimensional) image capturing applications, in products such as digital cameras, mobile devices, digital tablets, smart TVs, surveillance systems, motion sensing input devices, driving recording systems, rearview camera systems, wearable devices, and unmanned aerial vehicles.

According to the present disclosure, an imaging apparatus is provided. The imaging apparatus includes the aforementioned photographing optical lens assembly and an image sensor, wherein the image sensor is disposed on the image side of the aforementioned photographing optical lens assembly, that is, the image sensor can be disposed on or near the image surface of the aforementioned photographing optical lens assembly. It is favorable for enlarging field of view and reducing the back focal length by the weaker positive refractive power of the first lens element, and favorable for the light incident into the photographing optical lens assembly by the stronger positive refractive power of the second lens element, then the light can be focused on the image surface by the positive refractive power of the sixth lens element, and off-axis aberration can be corrected by the seventh lens element with negative refractive power. Preferably, the imaging apparatus can further include a barrel member, a holder member or a combination thereof.

According to the present disclosure, an electronic device is provided, wherein the electronic device includes the aforementioned imaging apparatus. Therefore, it is favorable for enhancing the image quality.

Furthermore, according to the present disclosure, an electronic device is provided, which can include at least two imaging apparatuses, which include a first imaging apparatus and a second imaging apparatus, wherein the first imaging apparatus and the second imaging apparatus are both facing toward an object side, each of the first imaging apparatus and the second imaging apparatus has a single focal point. The first imaging apparatus includes a lens assembly and a first image sensor, the first image sensor is disposed on an image surface of the lens assembly, and the first imaging apparatus has a field of view between 25 degrees and 60 degrees. Thus, the preferable image quality in the general field of view can be obtained. The second imaging apparatus includes the aforementioned photographing optical lens assembly and a second image sensor, the second image sensor is disposed on the image surface of the photographing optical lens assembly, and the second imaging apparatus has a field of view between 70 degrees and 120 degrees. Therefore, the wide-angle photographing can be provided. Preferably, the electronic device can further include, but not limited to, a control unit, a display, a storage unit, a random access memory unit (RAM) or a combination thereof.

According to the above description of the present disclosure, the following specific embodiments are provided for further explanation.

1st Embodiment

Figure 2:
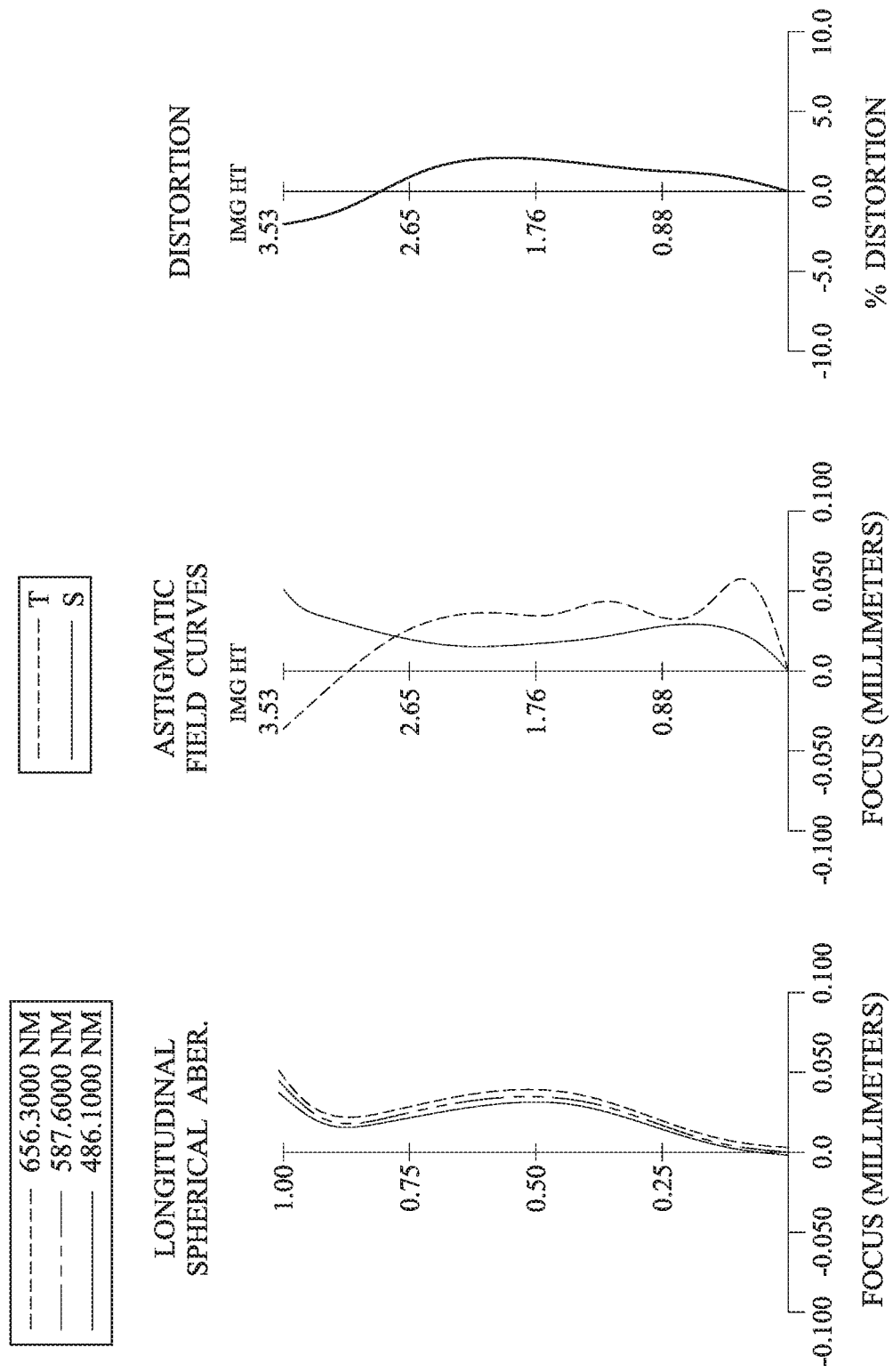
FIG. 2 shows spherical aberration curves, astigmatic field curves and a distortion curve of the imaging apparatus according to the 1st embodiment.

FIG. 1 is a schematic view of an imaging apparatus according to the 1st embodiment of the present disclosure. FIG. 2 shows spherical aberration curves, astigmatic field curves and a distortion curve of the imaging apparatus according to the 1st embodiment. In FIG. 1, the imaging apparatus includes a photographing optical lens assembly (its reference numeral is omitted) and an image sensor 195. The photographing optical lens assembly includes, in order from an object side to an image side, a first lens element 110, an aperture stop 100, a second lens element 120, a stop 105, a third lens element 130, a fourth lens element 140, a fifth lens element 150, a sixth lens element 160, a seventh lens element 170, an IR-cut filter 180, and an image surface 190, wherein the image sensor 195 is disposed on the image surface 190 of the photographing optical lens assembly. The photographing optical lens assembly includes seventh lens elements (110, 120, 130, 140, 150, 160, 170) without additional one or more lens elements inserted between the first lens element 110 and the seventh lens element 170.

The first lens element 110 with positive refractive power has an object-side surface 111 being convex in a paraxial region thereof and an image-side surface 112 being concave in a paraxial region thereof. The first lens element 110 is made of a plastic material, and has the object-side surface 111 and the image-side surface 112 being both aspheric.

The second lens element 120 with positive refractive power has an object-side surface 121 being concave in a paraxial region thereof and an image-side surface 122 being convex in a paraxial region thereof. The second lens element 120 is made of a plastic material, and has the object-side surface 121 and the image-side surface 122 being both aspheric.

The third lens element 130 with negative refractive power has an object-side surface 131 being convex in a paraxial region thereof and an image-side surface 132 being concave in a paraxial region thereof. The third lens element 130 is made of a plastic material, and has the object-side surface 131 and the image-side surface 132 being both aspheric.

The fourth lens element 140 with negative refractive power has an object-side surface 141 being convex in a paraxial region thereof and an image-side surface 142 being concave in a paraxial region thereof. The fourth lens element 140 is made of a plastic material, and has the object-side surface 141 and the image-side surface 142 being both aspheric.

The fifth lens element 150 with positive refractive power has an object-side surface 151 being convex in a paraxial region thereof and an image-side surface 152 being concave in a paraxial region thereof. The fifth lens element 150 is made of a plastic material, and has the object-side surface 151 and the image-side surface 152 being both aspheric.

The sixth lens element 160 with positive refractive power has an object-side surface 161 being concave in a paraxial region thereof and an image-side surface 162 being convex in a paraxial region thereof. The sixth lens element 160 is made of a plastic material, and has the object-side surface 161 and the image-side surface 162 being both aspheric.

The seventh lens element 170 with negative refractive power has an object-side surface 171 being convex in a paraxial region thereof and an image-side surface 172 being concave in a paraxial region thereof. The seventh lens element 170 is made of a plastic material, and has the object-side surface 171 and the image-side surface 172 being both aspheric. Furthermore, the image-side surface 172 of the seventh lens element 170 includes at least one convex critical point in an off-axis region thereof.

The IR-cut filter 180 is made of a glass material, which is located between the seventh lens element 170 and the image surface 190, and will not affect the focal length of the photographing optical lens assembly.

The equation of the aspheric surface profiles of the aforementioned lens elements of the 1st embodiment is expressed as follows:

$$X(Y) = (Y^2/R)/(1 + \text{sqrt}(1 - (1+k) \times (Y/R)^2)) + \sum_i (Ai) \times (Y^i),$$

where,
X is the relative distance between a point on the aspheric surface spaced at a distance Y from the optical axis and the tangential plane at the aspheric surface vertex on the optical axis;
Y is the vertical distance from the point on the aspheric surface to the optical axis;
R is the curvature radius;
k is the conic coefficient; and
Ai is the i-th aspheric coefficient.

In the photographing optical lens assembly according to the 1st embodiment, when a focal length of the photographing optical lens assembly is f, an f-number of the photographing optical lens assembly is Fno, and half of a maximum field of view of the photographing optical lens assembly is HFOV, these parameters have the following values: f=3.65 mm; Fno=1.72; and HFOV=44.5 degrees.

In the photographing optical lens assembly according to the 1st embodiment, when the maximum field of view of the photographing optical lens assembly is FOV, the following condition is satisfied: FOV=89.0 degrees.

In the photographing optical lens assembly according to the 1st embodiment, when a refractive index of the first lens element 110 is N1, a refractive index of the second lens element 120 is N2, a refractive index of the third lens element 130 is N3, a refractive index of the fourth lens element 140 is N4, a refractive index of the fifth lens element 150 is N5, a refractive index of the sixth lens element 160 is N6, a refractive index of the seventh lens element 170 is N7, and a maximum refractive index of a lens element of the optical photographing lens assembly is Nmax (that is, a maximum value of N1, N2, N3, N4, N5, N6 and N7; according to the first embodiment, Nmax=N3), the following condition is satisfied: Nmax=1.669.

In the photographing optical lens assembly according to the 1st embodiment, when an Abbe number of the first lens element 110 is V1, an Abbe number of the second lens element 120 is V2, an Abbe number of the third lens element 130 is V3, an Abbe number of the fourth lens element 140 is V4, an Abbe number of the fifth lens element 150 is V5, an Abbe number of the sixth lens element 160 is V6, an Abbe number of the seventh lens element 170 is V7, and a total number of the lens elements having Abbe numbers less than 20 is V20 (that is, a total number of V1, V2, V3, V4, V5, V6 and V7 less than 20), the following condition is satisfied: V20=1. In detail, according to the 1st embodiment, the Abbe number of the third lens element 130 is less than 20. Moreover, the following condition is satisfied: V3+V4+V5=115.83.

In the photographing optical lens assembly according to the 1st embodiment, when the focal length of the photographing optical lens assembly is f, an entrance pupil diameter of the photographing optical lens assembly is EPD, an axial distance between the object-side surface 111 of the first lens element 110 and the image surface 190 is TL, and a maximum image height of the photographing optical lens assembly is ImgH (half of a diagonal length of an effective photosensitive area of the image sensor 195), the following conditions are satisfied: f/EPD=1.72; TL/EPD=2.54; and TL/ImgH=1.53, wherein f/EPD is equal to Fno.

In the photographing optical lens assembly according to the 1st embodiment, when a central thickness of the first lens element 110 is CT1, a central thickness of the second lens element 120 is CT2, a central thickness of the third lens element 130 is CT3, a central thickness of the fourth lens element 140 is CT4, a central thickness of the fifth lens element 150 is CT5, a central thickness of the sixth lens element 160 is CT6, a central thickness of the seventh lens element 170 is CT7, a sum of central thicknesses of all lens elements of the photographing optical lens assembly is ΣCT (that is, ΣCT=CT1+CT2+CT3+CT4+CT5+CT6+CT7), an axial distance between the first lens element 110 and the second lens element 120 is T12, an axial distance between the second lens element 120 and the third lens element 130 is T23, an axial distance between the third lens element 130 and the fourth lens element 140 is T34, an axial distance between the fourth lens element 140 and the fifth lens element 150 is T45, an axial distance between the fifth lens element 150 and the sixth lens element 160 is T56, an axial distance between the sixth lens element 160 and the seventh lens element 170 is T67, and a sum of all axial distances between adjacent lens elements of the photographing optical lens assembly is ΣAT (that is, ΣAT=T12+T23+T34+T45+T56+T67), the following conditions are satisfied: CT2/CT1=0.91; (CT2+CT6)/(CT3+CT5)=1.94; CT5/CT4=0.68; and ΣCT/ΣAT=3.48.

Figure 15:
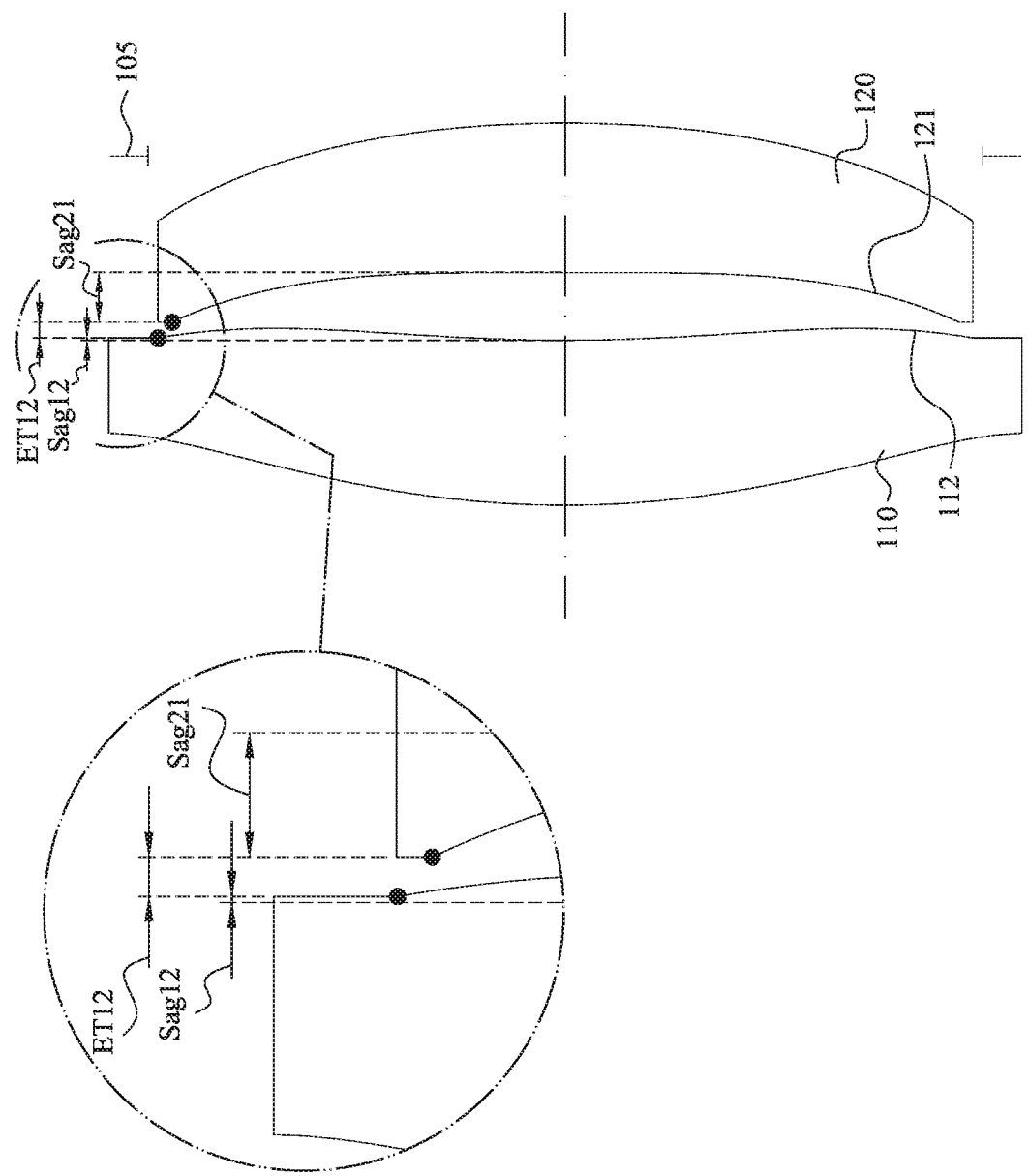
FIG. 15 shows a schematic view of a parameter ET12 of the photographing optical lens assembly according to the 1st embodiment of FIG. 1.

FIG. 15 shows a schematic view of a parameter ET12 of the photographing optical lens assembly according to the 1st embodiment of FIG. 1. In FIG. 15, when an axial distance between a maximum effective radius position on the image-side surface 112 of the first lens element 110 and a maximum effective radius position on the object-side surface 121 of the second lens element 120 is ET12, in detail, a displacement in parallel with an optical axis from an axial vertex on the image-side surface 112 of the first lens element 110 to the maximum effective radius position on the image-side surface 112 of the first lens element 110 is Sag12, a displacement in parallel with the optical axis from an axial vertex on the object-side surface 121 of the second lens element 120 to the maximum effective radius position on the object-side surface 121 of the second lens element 120 is Sag21, the axial distance between the first lens element 110 and the second lens element 120 is T12, and ET12 is T12−(Sag12+Sag21), the following condition is satisfied: T12/ET12=4.31.

In the photographing optical lens assembly according to the 1st embodiment, when a curvature radius of the object-side surface 111 of the first lens element 110 is R1, and a curvature radius of the object-side surface 121 of the second lens element 120 is R3, the following condition is satisfied: |R1|/R3=−0.03.

In the photographing optical lens assembly according to the 1st embodiment, when a curvature radius of the object-side surface 161 of the sixth lens element 160 is R11, and a curvature radius of the image-side surface 162 of the sixth lens element 160 is R12, the following condition is satisfied: (R11+R12)/(R11−R12)=1.58.

In the photographing optical lens assembly according to the 1st embodiment, when the focal length of the photographing optical lens assembly is f, and a curvature radius of the image-side surface 152 of the fifth lens element 150 is R10, the following condition is satisfied: f/R10=1.11.

In the photographing optical lens assembly according to the 1st embodiment, when a focal length of the first lens element 110 is f1, a focal length of the second lens element 120 is f2, a focal length of the third lens element 130 is f3, a focal length of the fourth lens element 140 is f4, a focal length of the fifth lens element 150 is f5, a focal length of the sixth lens element 160 is f6, and a focal length of the seventh lens element 170 is f7, the following conditions are satisfied: |f1/f2|=1.63; |f2/f3|=0.90; |f3/f1|=0.68; |f6/f4|=0.32; |f6/f5|=0.55; |f7/f6|=0.97; |f/f3|+|f/f4|+|f/f5|=1.60; f/f6=1.21; and |f/f6|+|f/f7|=2.46.

The detailed optical data of the 1st embodiment are shown in Table 1 and the aspheric surface data are shown in Table 2 below.

TABLE 1

1st Embodiment
f = 3.65 mm, Fno = 1.72, HFOV = 44.5 deg.

| Surface # | | Curvature Radius | | Thickness | Material | Index | Abbe # | Focal Length |
|---|---|---|---|---|---|---|---|---|
| 0 | Object | Plano | | Infinity | | | | |
| 1 | Lens 1 | 2.592 | ASP | 0.435 | Plastic | 1.544 | 55.9 | 9.95 |
| 2 | | 4.683 | ASP | 0.025 | | | | |
| 3 | Ape. Stop | Plano | | 0.154 | | | | |
| 4 | Lens 2 | −100.000 | ASP | 0.394 | Plastic | 1.544 | 55.9 | 6.12 |
| 5 | | −3.226 | ASP | −0.087 | | | | |
| 6 | Stop | Plano | | 0.117 | | | | |
| 7 | Lens 3 | 3.671 | ASP | 0.260 | Plastic | 1.669 | 19.5 | −6.79 |
| 8 | | 1.972 | ASP | 0.200 | | | | |
| 9 | Lens 4 | 12.015 | ASP | 0.464 | Plastic | 1.559 | 40.4 | −9.29 |
| 10 | | 3.575 | ASP | 0.039 | | | | |
| 11 | Lens 5 | 1.612 | ASP | 0.314 | Plastic | 1.544 | 55.9 | 5.45 |
| 12 | | 3.292 | ASP | 0.237 | | | | |
| 13 | Lens 6 | −5.952 | ASP | 0.718 | Plastic | 1.544 | 55.9 | 3.01 |
| 14 | | −1.338 | ASP | 0.232 | | | | |
| 15 | Lens 7 | 3.268 | ASP | 0.606 | Plastic | 1.552 | 48.7 | −2.93 |
| 16 | | 1.011 | ASP | 0.729 | | | | |
| 17 | IR-cut filter | Plano | | 0.210 | Glass | 1.517 | 64.2 | — |
| 18 | | Plano | | 0.338 | | | | |
| 19 | Image | Plano | | — | | | | |

Reference wavelength is 587.6 nm (d-line).
Effective radius of Surface 6 is 1.100 mm.

TABLE 2

Aspheric Coefficients

| | Surface # | | | | | | |
|---|---|---|---|---|---|---|---|
| | 1 | 2 | 4 | 5 | 7 | 8 | 9 |
| k = | −1.5612E+00 | −4.2691E+00 | −5.7652E+01 | −1.3736E+01 | −9.9806E+00 | −3.4302E+00 | −5.8541E+01 |
| A4 = | −1.5267E−02 | −8.1280E−02 | −1.1459E−01 | −8.9258E−02 | −7.2675E−02 | −8.0787E−02 | −1.5617E−02 |
| A6 = | −1.0171E−02 | −2.2735E−02 | −5.0953E−02 | −3.3267E−02 | 1.9437E−03 | 7.2308E−02 | 3.2038E−02 |
| A8 = | 2.2218E−03 | 2.3903E−02 | 1.0536E−01 | 9.9676E−02 | −4.8092E−03 | −9.2245E−02 | −5.5434E−02 |
| A10 = | −4.9514E−03 | −5.6423E−03 | −4.9688E−02 | −8.5379E−02 | −2.0352E−02 | 6.1689E−02 | 5.6300E−02 |
| A12 = | 3.7466E−04 | | | 2.0567E−02 | 1.0281E−02 | −2.4347E−02 | −4.2644E−02 |
| A14 = | | | | | | 3.8443E−03 | 1.5577E−02 |
| A16 = | | | | | | | −1.8371E−03 |

| | Surface # | | | | | | |
|---|---|---|---|---|---|---|---|
| | 10 | 11 | 12 | 13 | 14 | 15 | 16 |
| k = | −9.9000E+01 | −1.5181E+01 | −5.8951E+00 | −1.0605E+01 | −1.6452E+00 | −9.9000E+01 | −5.0830E+00 |
| A4 = | −1.4892E−01 | 7.2990E−03 | 2.5451E−03 | −3.9627E−03 | −4.8194E−02 | −1.5044E−01 | −7.5354E−02 |
| A6 = | 1.5635E−01 | −1.2363E−01 | −7.9294E−02 | 2.6162E−02 | 1.2872E−01 | 5.6982E−02 | 3.0352E−02 |
| A8 = | −1.9499E−01 | 9.2262E−02 | 1.3329E−02 | −9.4728E−02 | −1.7482E−01 | −2.9305E−02 | −8.9325E−03 |
| A10 = | 1.4500E−01 | −5.6804E−02 | 2.6043E−02 | 9.0552E−02 | 1.1900E−01 | 1.6393E−02 | 1.6857E−03 |
| A12 = | −6.5679E−02 | 2.7037E−02 | −2.3777E−02 | −3.8569E−02 | −3.7445E−02 | −6.8266E−03 | −1.9927E−04 |
| A14 = | 1.6444E−02 | −6.1148E−03 | 9.1987E−03 | 8.3086E−03 | 5.1264E−03 | 1.4869E−03 | 1.3117E−05 |
| A16 = | −1.5262E−03 | 4.2039E−04 | −1.2984E−03 | −7.8834E−04 | −2.1843E−04 | −1.2020E−04 | −3.6193E−07 |

In Table 1, the curvature radius, the thickness and the focal length are shown in millimeters (mm). Surface numbers 0-19 represent the surfaces sequentially arranged from the object side to the image side along the optical axis. In Table 2, k represents the conic coefficient of the equation of the aspheric surface profiles. A4-A16 represent the aspheric coefficients ranging from the 4th order to the 16th order. The tables presented below for each embodiment correspond to schematic parameter and aberration curves of each embodiment, and term definitions of the tables are the same as those in Table 1 and Table 2 of the 1st embodiment. Therefore, an explanation in this regard will not be provided again.

2nd Embodiment

Figure 3:
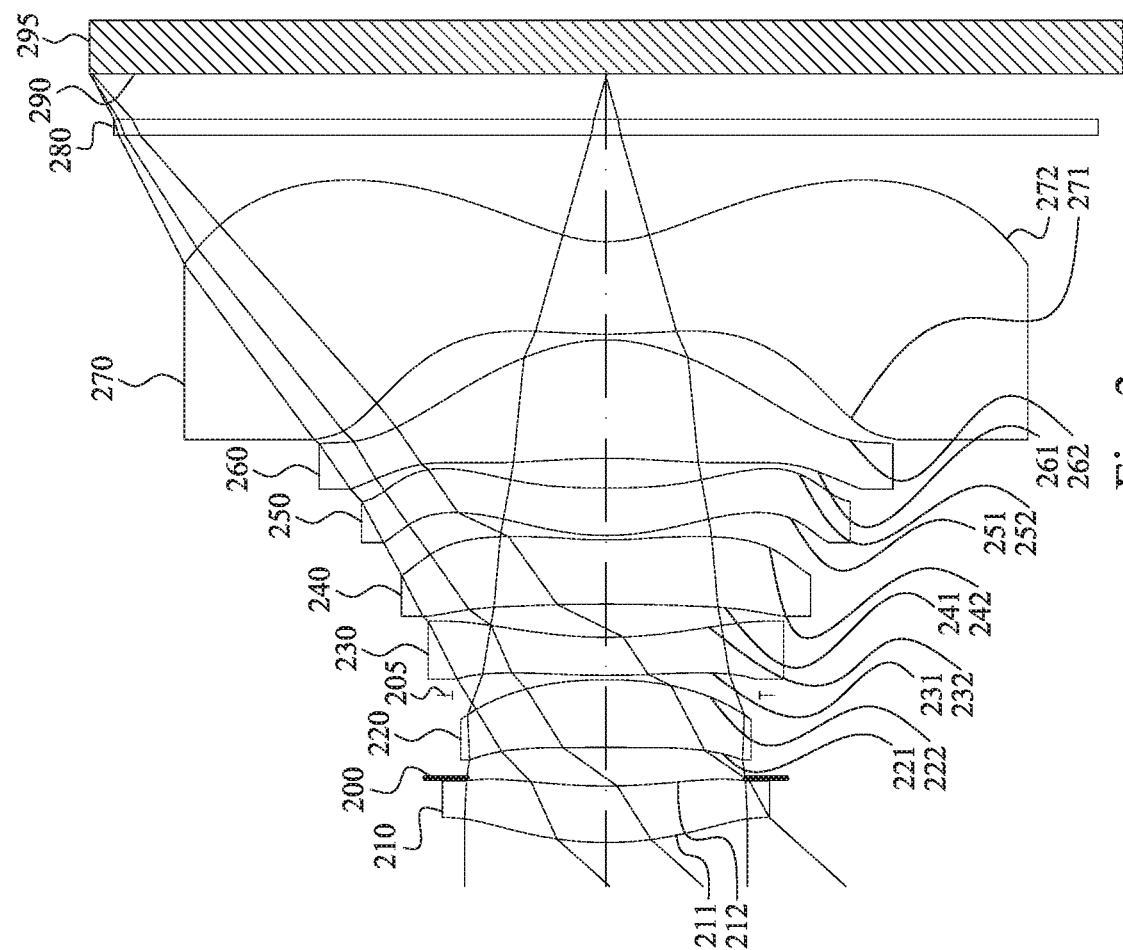
FIG. 3 is a schematic view of an imaging apparatus according to the 2nd embodiment of the present disclosure.
Figure 4:
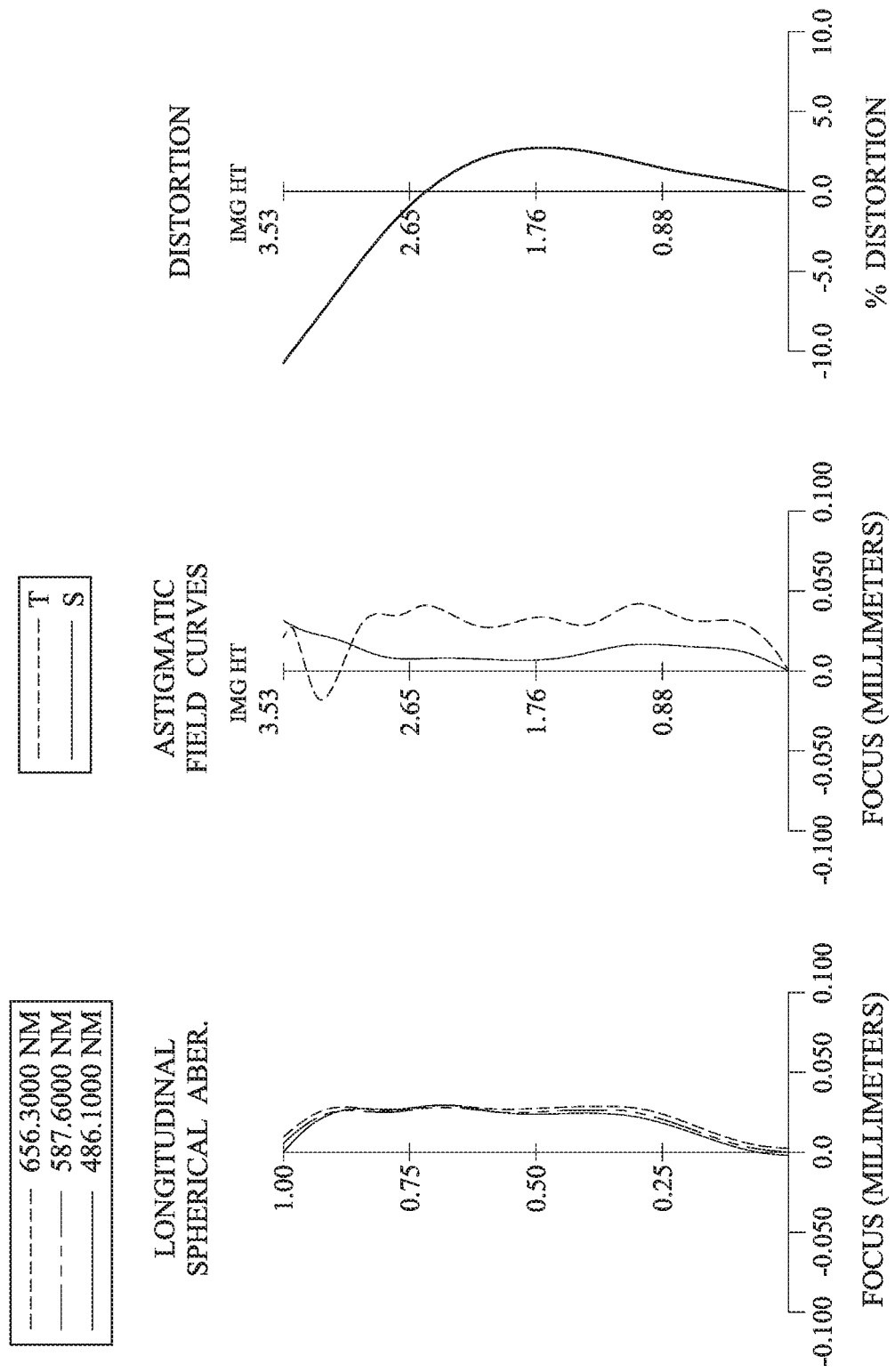
FIG. 4 shows spherical aberration curves, astigmatic field curves and a distortion curve of the imaging apparatus according to the 2nd embodiment.

FIG. 3 is a schematic view of an imaging apparatus according to the 2nd embodiment of the present disclosure. FIG. 4 shows spherical aberration curves, astigmatic field curves and a distortion curve of the imaging apparatus according to the 2nd embodiment. In FIG. 3, the imaging apparatus includes a photographing optical lens assembly (its reference numeral is omitted) and an image sensor 295. The photographing optical lens assembly includes, in order from an object side to an image side, a first lens element 210, an aperture stop 200, a second lens element 220, a stop 205, a third lens element 230, a fourth lens element 240, a fifth lens element 250, a sixth lens element 260, a seventh lens element 270, an IR-cut filter 280, and an image surface 290, wherein the image sensor 295 is disposed on the image surface 290 of the photographing optical lens assembly. The photographing optical lens assembly includes seventh lens elements (210, 220, 230, 240, 250, 260, 270) without additional one or more lens elements inserted between the first lens element 210 and the seventh lens element 270.

The first lens element 210 with positive refractive power has an object-side surface 211 being convex in a paraxial region thereof and an image-side surface 212 being concave in a paraxial region thereof. The first lens element 210 is made of a plastic material, and has the object-side surface 211 and the image-side surface 212 being both aspheric.

The second lens element 220 with positive refractive power has an object-side surface 221 being planar in a paraxial region thereof and an image-side surface 222 being convex in a paraxial region thereof. The second lens element 220 is made of a plastic material, and has the object-side surface 221 and the image-side surface 222 being both aspheric.

The third lens element 230 with negative refractive power has an object-side surface 231 being convex in a paraxial region thereof and an image-side surface 232 being concave in a paraxial region thereof. The third lens element 230 is made of a plastic material, and has the object-side surface 231 and the image-side surface 232 being both aspheric.

The fourth lens element 240 with negative refractive power has an object-side surface 241 being concave in a paraxial region thereof and an image-side surface 242 being concave in a paraxial region thereof. The fourth lens element 240 is made of a plastic material, and has the object-side surface 241 and the image-side surface 242 being both aspheric.

The fifth lens element 250 with positive refractive power has an object-side surface 251 being convex in a paraxial region thereof and an image-side surface 252 being concave in a paraxial region thereof. The fifth lens element 250 is made of a plastic material, and has the object-side surface 251 and the image-side surface 252 being both aspheric.

The sixth lens element 260 with positive refractive power has an object-side surface 261 being concave in a paraxial region thereof and an image-side surface 262 being convex in a paraxial region thereof. The sixth lens element 260 is made of a plastic material, and has the object-side surface 261 and the image-side surface 262 being both aspheric.

The seventh lens element 270 with negative refractive power has an object-side surface 271 being convex in a paraxial region thereof and an image-side surface 272 being concave in a paraxial region thereof. The seventh lens element 270 is made of a plastic material, and has the object-side surface 271 and the image-side surface 272 being both aspheric. Furthermore, the image-side surface 272 of the seventh lens element 270 includes at least one convex critical point in an off-axis region thereof.

The IR-cut filter 280 is made of a glass material, which is located between the seventh lens element 270 and the image surface 290, and will not affect the focal length of the photographing optical lens assembly.

The detailed optical data of the 2nd embodiment are shown in Table 3 and the aspheric surface data are shown in Table 4 below.

TABLE 3

2nd Embodiment
f = 3.52 mm, Fno = 1.82, HFOV = 48.0 deg.

| Surface # | | Curvature Radius | | Thickness | Material | Index | Abbe # | Focal Length |
|---|---|---|---|---|---|---|---|---|
| 0 | Object | Plano | | Infinity | | | | |
| 1 | Lens 1 | 2.244 | ASP | 0.387 | Plastic | 1.544 | 56.0 | 8.82 |
| 2 | | 3.961 | ASP | 0.054 | | | | |
| 3 | Ape. Stop | Plano | | 0.209 | | | | |
| 4 | Lens 2 | ∞ | ASP | 0.464 | Plastic | 1.544 | 56.0 | 4.69 |
| 5 | | −2.554 | ASP | −0.107 | | | | |
| 6 | Stop | Plano | | 0.137 | | | | |
| 7 | Lens 3 | 7.217 | ASP | 0.260 | Plastic | 1.688 | 18.7 | −8.30 |
| 8 | | 3.140 | ASP | 0.226 | | | | |
| 9 | Lens 4 | −16.023 | ASP | 0.440 | Plastic | 1.570 | 39.0 | −4.33 |
| 10 | | 2.950 | ASP | 0.030 | | | | |
| 11 | Lens 5 | 1.613 | ASP | 0.325 | Plastic | 1.544 | 56.0 | 3.58 |
| 12 | | 8.788 | ASP | 0.203 | | | | |
| 13 | Lens 6 | −3.860 | ASP | 0.810 | Plastic | 1.544 | 56.0 | 2.66 |
| 14 | | −1.131 | ASP | 0.039 | | | | |
| 15 | Lens 7 | 3.698 | ASP | 0.632 | Plastic | 1.544 | 56.0 | −2.22 |
| 16 | | 0.857 | ASP | 0.729 | | | | |
| 17 | IR-cut filter | Plano | | 0.110 | Glass | 1.517 | 64.2 | — |
| 18 | | Plano | | 0.309 | | | | |
| 19 | Image | Plano | | — | | | | |

Reference wavelength is 587.6 nm (d-line).
Effective radius of Surface 6 is 1.050 mm.
Effective radius of Surface 11 is 1.520 mm.

TABLE 4

Aspheric Coefficients

| Surface # | | | | | | | |
|---|---|---|---|---|---|---|---|
| | 1 | 2 | 4 | 5 | 7 | 8 | 9 |
| k = | −3.1177E+00 | −3.0072E+00 | 0.0000E+00 | −5.4429E+00 | −1.2198E+01 | −1.6006E+00 | −9.9000E+01 |
| A4 = | −1.6302E−03 | −4.2634E−02 | −7.5544E−02 | 1.2602E−03 | 4.4322E−02 | 5.3655E−03 | −5.7957E−02 |
| A6 = | 3.0177E−02 | −6.8731E−02 | −4.5412E−02 | −7.2534E−01 | −6.8299E−01 | −1.5840E−01 | 2.5303E−01 |
| A8 = | −2.2093E−01 | 5.1198E−02 | −2.4094E−02 | 2.1575E+00 | 1.6951E+00 | 1.5930E−01 | −4.9679E−01 |
| A10 = | 4.1087E−01 | −1.3428E−01 | −1.3851E−01 | −3.6591E+00 | −2.4458E+00 | −3.8211E−02 | 4.8487E−01 |
| A12 = | −4.3626E−01 | 1.9426E−01 | 5.0208E−01 | 3.6839E+00 | 2.1851E+00 | −4.1699E−02 | −2.8743E−01 |
| A14 = | 2.1965E−01 | −1.4869E−01 | −5.1348E−01 | −2.0422E+00 | −1.1383E+00 | 2.6171E−02 | 1.0252E−01 |
| A16 = | −3.8944E−02 | 5.8487E−02 | 1.8712E−01 | 4.7607E−01 | 2.5651E−01 | −3.5176E−03 | −1.5930E−02 |

| Surface # | | | | | | | |
|---|---|---|---|---|---|---|---|
| | 10 | 11 | 12 | 13 | 14 | 15 | 16 |
| k = | −3.9520E+01 | −8.2419E+00 | 1.5383E+01 | −2.5189E+01 | −1.6086E+00 | −9.9000E+01 | −4.1449E+00 |
| A4 = | −2.9735E−02 | −3.8929E−02 | 3.3283E−01 | 1.7451E−01 | 1.8307E−01 | −4.3883E−02 | −8.3562E−02 |
| A6 = | 5.0821E−01 | 1.6151E−01 | −4.6182E−01 | −2.3119E−01 | −2.8666E−01 | −2.0946E−01 | 3.2056E−02 |
| A8 = | −6.4404E−01 | −5.2608E−01 | 2.3797E−01 | 2.5442E−01 | 2.4174E−01 | 2.3310E−01 | −8.3235E−03 |
| A10 = | 5.2359E−01 | 6.1659E−01 | −1.6818E−02 | −1.9020E−01 | −1.1189E−01 | −1.3062E−01 | 1.2957E−03 |
| A12 = | −2.7623E−01 | −3.5673E−01 | −4.4007E−02 | 7.6643E−02 | 2.9585E−02 | 4.0157E−02 | −1.1532E−04 |
| A14 = | 7.9360E−02 | 1.0011E−01 | 1.9002E−02 | −1.5264E−02 | −4.1541E−03 | −6.2209E−03 | 5.0404E−06 |
| A16 = | −8.6616E−03 | −1.0764E−02 | −2.3620E−03 | 1.1907E−03 | 2.3765E−04 | 3.7753E−04 | −7.1597E−08 |

In the 2nd embodiment, the equation of the aspheric surface profiles of the aforementioned lens elements is the same as the equation of the 1st embodiment. Also, the definitions of these parameters shown in the following table are the same as those stated in the 1st embodiment with corresponding values for the 2nd embodiment, so an explanation in this regard will not be provided again.

Moreover, these parameters can be calculated from Table 3 and Table 4 as the following values and satisfy the following conditions:

| 2nd Embodiment | | | |
|---|---|---|---|
| f [mm] | 3.52 | T12/ET12 | 1.83 |
| f/EPD | 1.82 | |R1|/R3 | 0.00 |
| HFOV [deg.] | 48.0 | (R11 + R12)/(R11 − R12) | 1.83 |
| FOV [deg.] | 96.0 | f/R10 | 0.40 |
| Nmax | 1.69 | |f1/f2| | 1.88 |
| V20 | 1 | |f2/f3| | 0.57 |
| V3 + V4 + V5 | 113.68 | |f3/f1| | 0.94 |
| TL/EPD | 2.72 | |f6/f4| | 0.61 |
| TL/ImgH | 1.49 | |f6/f5| | 0.74 |
| CT2/CT1 | 1.20 | |f7/f6| | 0.84 |
| (CT2 + CT6)/(CT3 + CT5) | 2.18 | |f/f3| + |f/f4| + |f/f5| | 2.22 |
| CT5/CT4 | 0.74 | f/f6 | 1.32 |
| ΣCT/ΣAT | 4.19 | |f/f6| + |f/f7| | 2.90 |

3rd Embodiment

Figure 5:
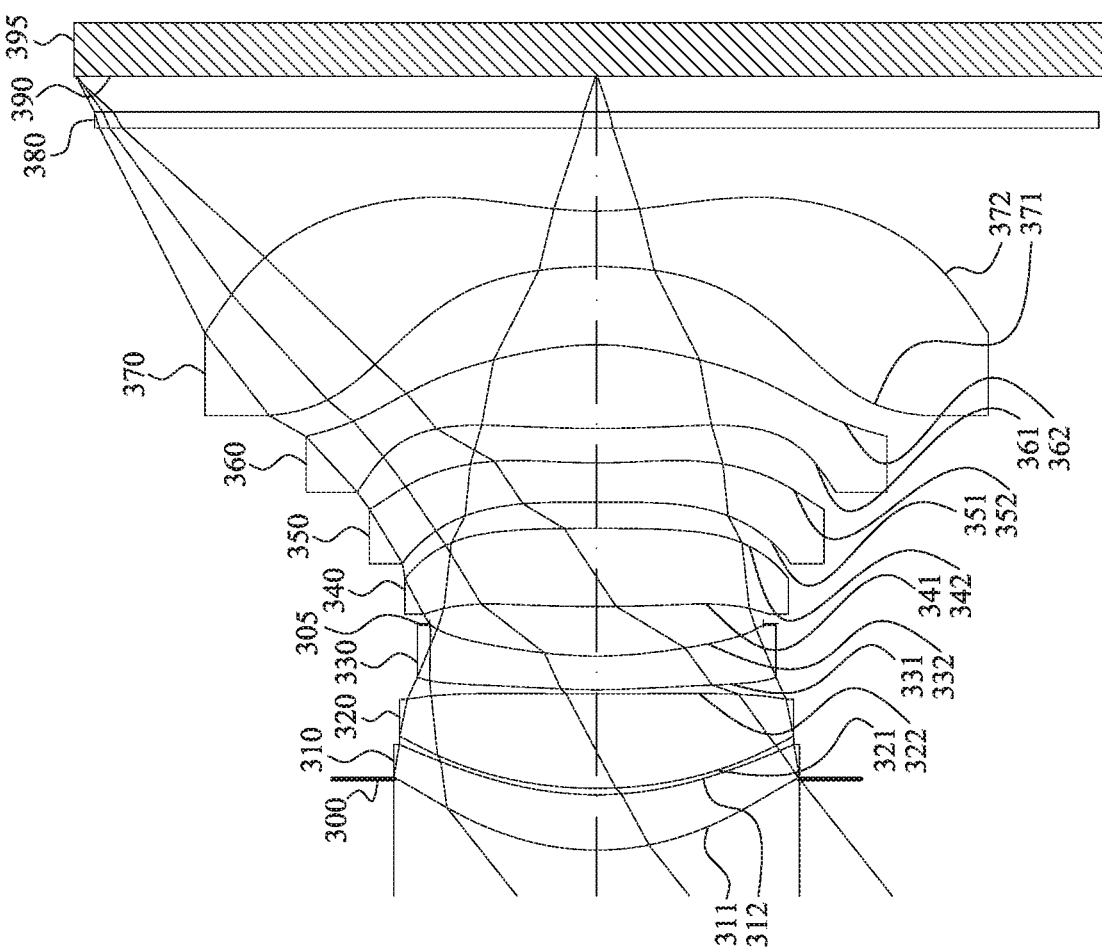
FIG. 5 is a schematic view of an imaging apparatus according to the 3rd embodiment of the present disclosure.
Figure 6:
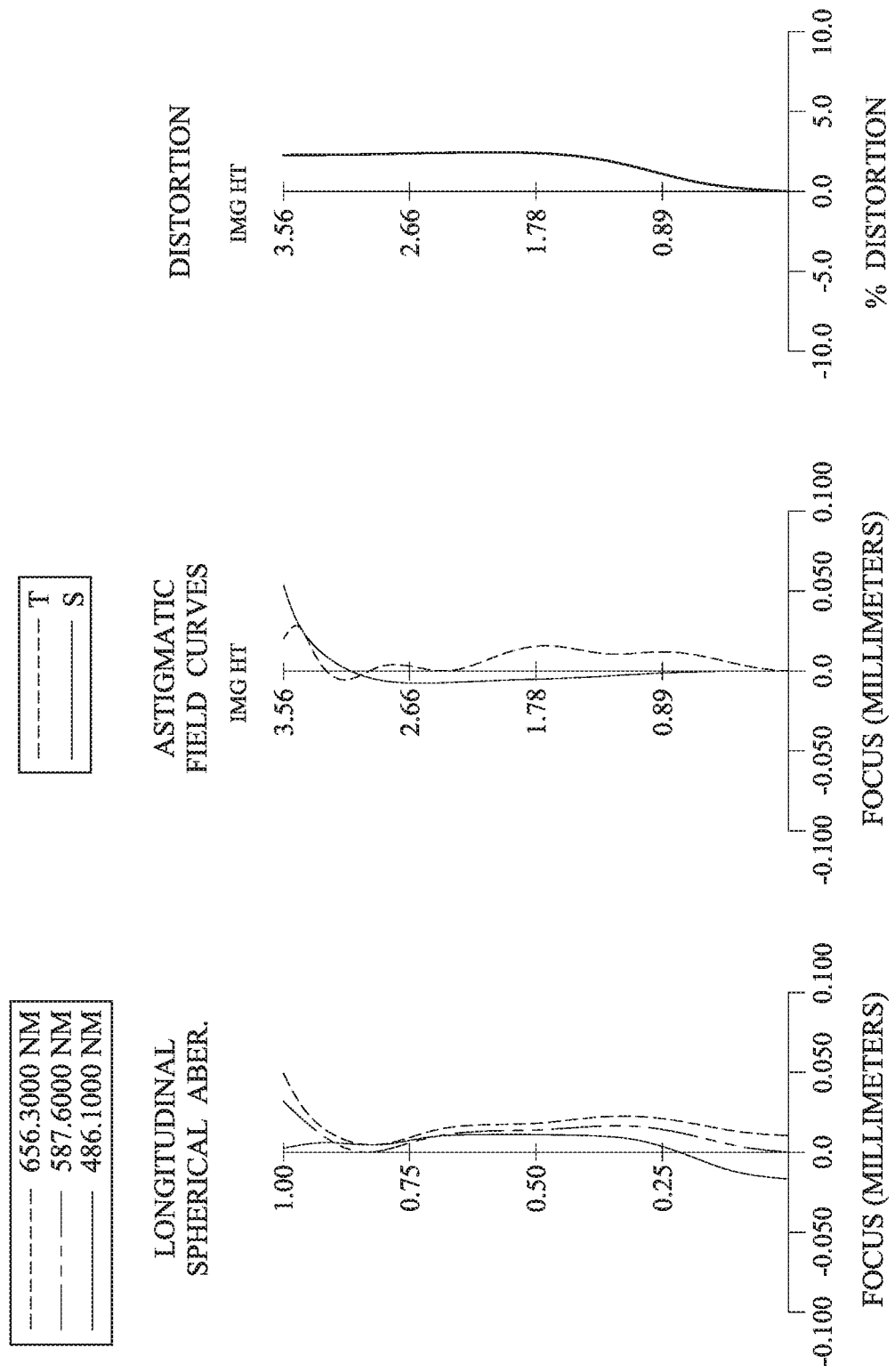
FIG. 6 shows spherical aberration curves, astigmatic field curves and a distortion curve of the imaging apparatus according to the 3rd embodiment.

FIG. 5 is a schematic view of an imaging apparatus according to the 3rd embodiment of the present disclosure. FIG. 6 shows spherical aberration curves, astigmatic field curves and a distortion curve of the imaging apparatus according to the 3rd embodiment. In FIG. 5, the imaging apparatus includes a photographing optical lens assembly (its reference numeral is omitted) and an image sensor 395. The photographing optical lens assembly includes, in order from an object side to an image side, an aperture stop 300, a first lens element 310, a second lens element 320, a third lens element 330, a stop 305, a fourth lens element 340, a fifth lens element 350, a sixth lens element 360, a seventh lens element 370, an IR-cut filter 380, and an image surface 390, wherein the image sensor 395 is disposed on the image surface 390 of the photographing optical lens assembly. The photographing optical lens assembly includes seventh lens elements (310, 320, 330, 340, 350, 360, 370) without additional one or more lens elements inserted between the first lens element 310 and the seventh lens element 370.

The first lens element 310 with positive refractive power has an object-side surface 311 being convex in a paraxial region thereof and an image-side surface 312 being concave in a paraxial region thereof. The first lens element 310 is made of a plastic material, and has the object-side surface 311 and the image-side surface 312 being both aspheric.

The second lens element 320 with positive refractive power has an object-side surface 321 being convex in a paraxial region thereof and an image-side surface 322 being concave in a paraxial region thereof. The second lens element 320 is made of a plastic material, and has the object-side surface 321 and the image-side surface 322 being both aspheric.

The third lens element 330 with negative refractive power has an object-side surface 331 being convex in a paraxial region thereof and an image-side surface 332 being concave in a paraxial region thereof. The third lens element 330 is made of a plastic material, and has the object-side surface 331 and the image-side surface 332 being both aspheric.

The fourth lens element 340 with positive refractive power has an object-side surface 341 being convex in a paraxial region thereof and an image-side surface 342 being convex in a paraxial region thereof. The fourth lens element 340 is made of a plastic material, and has the object-side surface 341 and the image-side surface 342 being both aspheric.

The fifth lens element 350 with negative refractive power has an object-side surface 351 being convex in a paraxial region thereof and an image-side surface 352 being concave in a paraxial region thereof. The fifth lens element 350 is made of a plastic material, and has the object-side surface 351 and the image-side surface 352 being both aspheric.

The sixth lens element 360 with positive refractive power has an object-side surface 361 being convex in a paraxial region thereof and an image-side surface 362 being convex in a paraxial region thereof. The sixth lens element 360 is made of a plastic material, and has the object-side surface 361 and the image-side surface 362 being both aspheric.

The seventh lens element 370 with negative refractive power has an object-side surface 371 being concave in a paraxial region thereof and an image-side surface 372 being concave in a paraxial region thereof. The seventh lens element 370 is made of a plastic material, and has the object-side surface 371 and the image-side surface 372 being both aspheric. Furthermore, the image-side surface 372 of the seventh lens element 370 includes at least one convex critical point in an off-axis region thereof.

The IR-cut filter 380 is made of a glass material, which is located between the seventh lens element 370 and the image surface 390, and will not affect the focal length of the photographing optical lens assembly.

The detailed optical data of the 3rd embodiment are shown in Table 5 and the aspheric surface data are shown in Table 6 below.

TABLE 5

3rd Embodiment
f = 4.38 mm, Fno = 1.58, HFOV = 38.4 deg.

| Surface # | | Curvature Radius | | Thickness | Material | Index | Abbe # | Focal Length |
|---|---|---|---|---|---|---|---|---|
| 0 | Object | Plano | | Infinity | | | | |
| 1 | Ape. Stop | Plano | | −0.486 | | | | |
| 2 | Lens 1 | 1.825 | ASP | 0.379 | Plastic | 1.545 | 56.1 | 11.53 |
| 3 | | 2.383 | ASP | 0.043 | | | | |
| 4 | Lens 2 | 2.844 | ASP | 0.645 | Plastic | 1.545 | 56.1 | 6.21 |
| 5 | | 16.406 | ASP | 0.030 | | | | |
| 6 | Lens 3 | 4.564 | ASP | 0.230 | Plastic | 1.669 | 19.5 | −10.85 |
| 7 | | 2.746 | ASP | 0.221 | | | | |
| 8 | Stop | Plano | | 0.117 | | | | |
| 9 | Lens 4 | 8.499 | ASP | 0.536 | Plastic | 1.566 | 37.4 | 10.83 |
| 10 | | −21.503 | ASP | 0.177 | | | | |
| 11 | Lens 5 | 21.389 | ASP | 0.270 | Plastic | 1.669 | 19.5 | −7.49 |
| 12 | | 4.037 | ASP | 0.236 | | | | |
| 13 | Lens 6 | 9.503 | ASP | 0.572 | Plastic | 1.566 | 37.4 | 2.96 |
| 14 | | −1.993 | ASP | 0.535 | | | | |
| 15 | Lens 7 | −3.096 | ASP | 0.380 | Plastic | 1.534 | 55.9 | −2.59 |
| 16 | | 2.601 | ASP | 0.567 | | | | |
| 17 | IR-cut filter | Plano | | 0.110 | Glass | 1.517 | 64.2 | — |
| 18 | | Plano | | 0.244 | | | | |
| 19 | Image | Plano | | — | | | | |

Reference wavelength is 587.6 nm (d-line).
Effective radius of Surface 8 is 1.140 mm.

TABLE 6

Aspheric Coefficients

| Surface # | | | | | | | |
|---|---|---|---|---|---|---|---|
| | 2 | 3 | 4 | 5 | 6 | 7 | 9 |
| k = | −1.0244E−02 | −5.4920E−02 | −1.1854E−01 | 7.1515E−11 | 2.7920E−09 | 6.0779E−02 | 2.8846E−10 |
| A4 = | −1.3122E−02 | −1.2416E−02 | 7.5281E−03 | −1.2771E−01 | −2.1660E−01 | −1.2265E−01 | −3.5331E−02 |
| A6 = | −3.6451E−03 | −5.8616E−03 | −4.1319E−03 | 2.8282E−01 | 3.4757E−01 | 1.1580E−01 | −1.3832E−02 |
| A8 = | −2.9697E−03 | −9.3111E−04 | 1.2489E−02 | −3.4581E−01 | −3.5519E−01 | −5.7500E−02 | −3.6291E−02 |
| A10 = | −9.2494E−04 | 7.2334E−04 | −2.0739E−02 | 2.2032E−01 | 2.0688E−01 | 1.1610E−02 | 4.3998E−02 |
| A12 = | | | 2.3194E−02 | −7.2940E−02 | −5.4460E−02 | 9.9236E−03 | −3.1058E−02 |
| A14 = | | | −1.2959E−02 | 1.0014E−02 | 4.6152E−03 | −1.0063E−03 | 1.0299E−02 |
| A16 = | | | 2.6029E−03 | | | | |

| Surface # | | | | | | | |
|---|---|---|---|---|---|---|---|
| | 10 | 11 | 12 | 13 | 14 | 15 | 16 |
| k = | 9.3287E−12 | −1.0000E+00 | −3.6395E+01 | −2.9641E+01 | −4.7139E+00 | −9.7105E−01 | −8.3137E+00 |
| A4 = | −7.8766E−02 | −2.9982E−01 | −2.1999E−01 | 9.1701E−03 | 5.8583E−02 | −4.0579E−02 | −8.2932E−02 |
| A6 = | 7.4345E−02 | 2.8460E−01 | 1.5317E−01 | −5.7491E−02 | −3.2643E−02 | −6.2546E−02 | 2.1139E−02 |
| A8 = | −1.3370E−01 | −1.8881E−01 | −7.6273E−02 | 8.7632E−04 | −3.6885E−02 | 3.5761E−02 | −3.3790E−03 |
| A10 = | 1.0179E−01 | 6.3356E−02 | 2.0675E−02 | 1.8186E−02 | 3.6019E−02 | −4.5887E−03 | 2.6979E−04 |
| A12 = | −7.7660E−02 | −5.3006E−02 | −3.7864E−03 | −7.5750E−03 | −1.1911E−02 | −5.1409E−04 | 1.4670E−06 |
| A14 = | 4.5811E−02 | 4.6436E−02 | 5.9615E−04 | −1.5255E−04 | 1.7919E−03 | 1.5985E−04 | −3.2802E−06 |
| A16 = | −1.1026E−02 | −1.2976E−02 | | 3.3155E−04 | −1.0466E−04 | −9.8363E−06 | 2.5074E−07 |

In the 3rd embodiment, the equation of the aspheric surface profiles of the aforementioned lens elements is the same as the equation of the 1st embodiment. Also, the definitions of these parameters shown in the following table are the same as those stated in the 1st embodiment with corresponding values for the 3rd embodiment, so an explanation in this regard will not be provided again.

Moreover, these parameters can be calculated from Table 5 and Table 6 as the following values and satisfy the following conditions:

| 3rd Embodiment | | | |
|---|---|---|---|
| f [mm] | 4.38 | T12/ET12 | 0.75 |
| f/EPD | 1.58 | |R1|/R3 | 0.64 |
| HFOV [deg.] | 38.4 | (R11 + R12)/(R11 − R12) | 0.65 |
| FOV [deg.] | 76.8 | f/R10 | 1.09 |
| Nmax | 1.67 | |f1/f2| | 1.86 |
| V20 | 2 | |f2/f3| | 0.57 |
| V3 + V4 + V5 | 76.34 | |f3/f1| | 0.94 |
| TL/EPD | 1.91 | |f6/f4| | 0.27 |
| TL/ImgH | 1.49 | |f6/f5| | 0.40 |
| CT2/CT1 | 1.70 | |f7/f6| | 0.87 |
| (CT2 + CT6)/(CT3 + CT5) | 2.43 | |f/f3| + |f/f4| + |f/f5| | 1.39 |
| CT5/CT4 | 0.50 | f/f6 | 1.48 |
| ΣCT/ΣAT | 2.22 | |f/f6| + |f/f7| | 3.17 |

4th Embodiment

Figure 7:
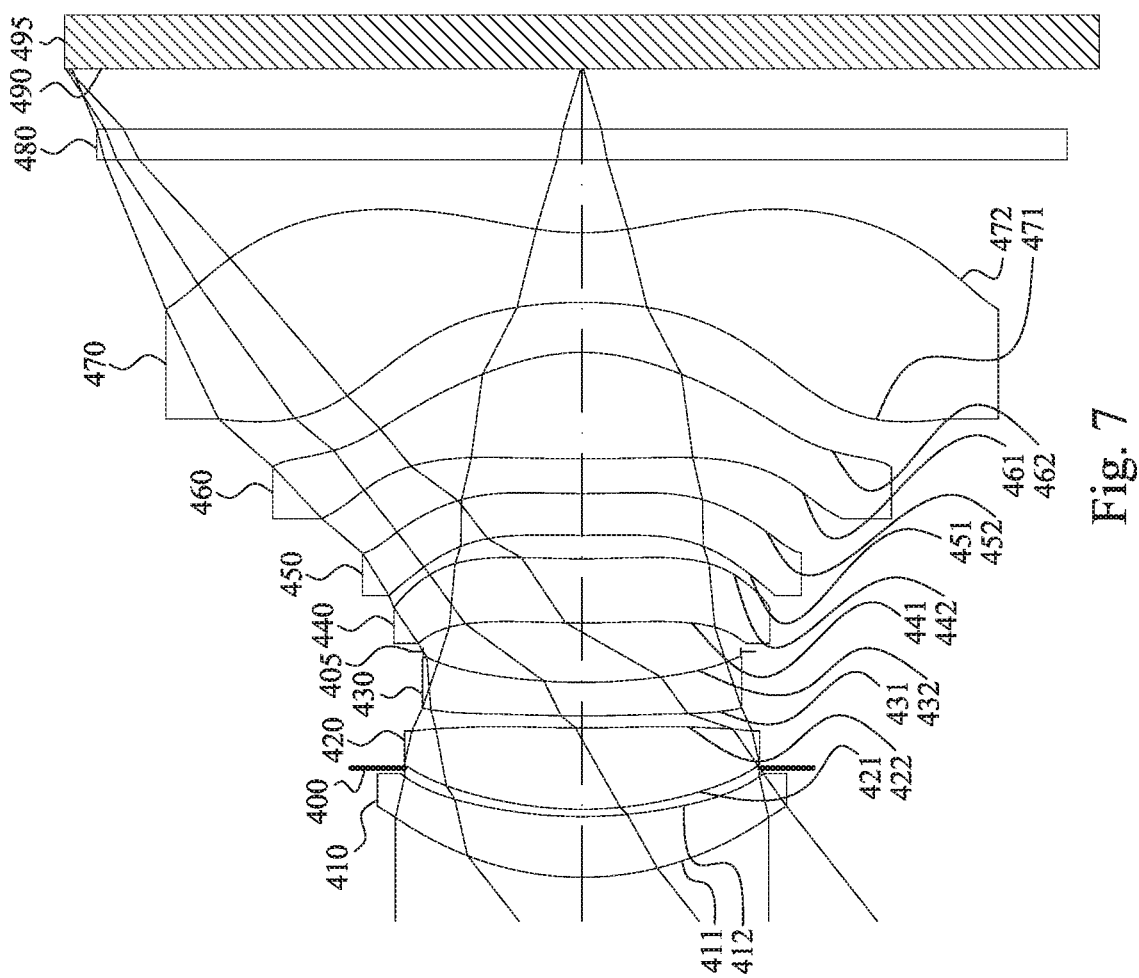
FIG. 7 is a schematic view of an imaging apparatus according to the 4th embodiment of the present disclosure.
Figure 8:
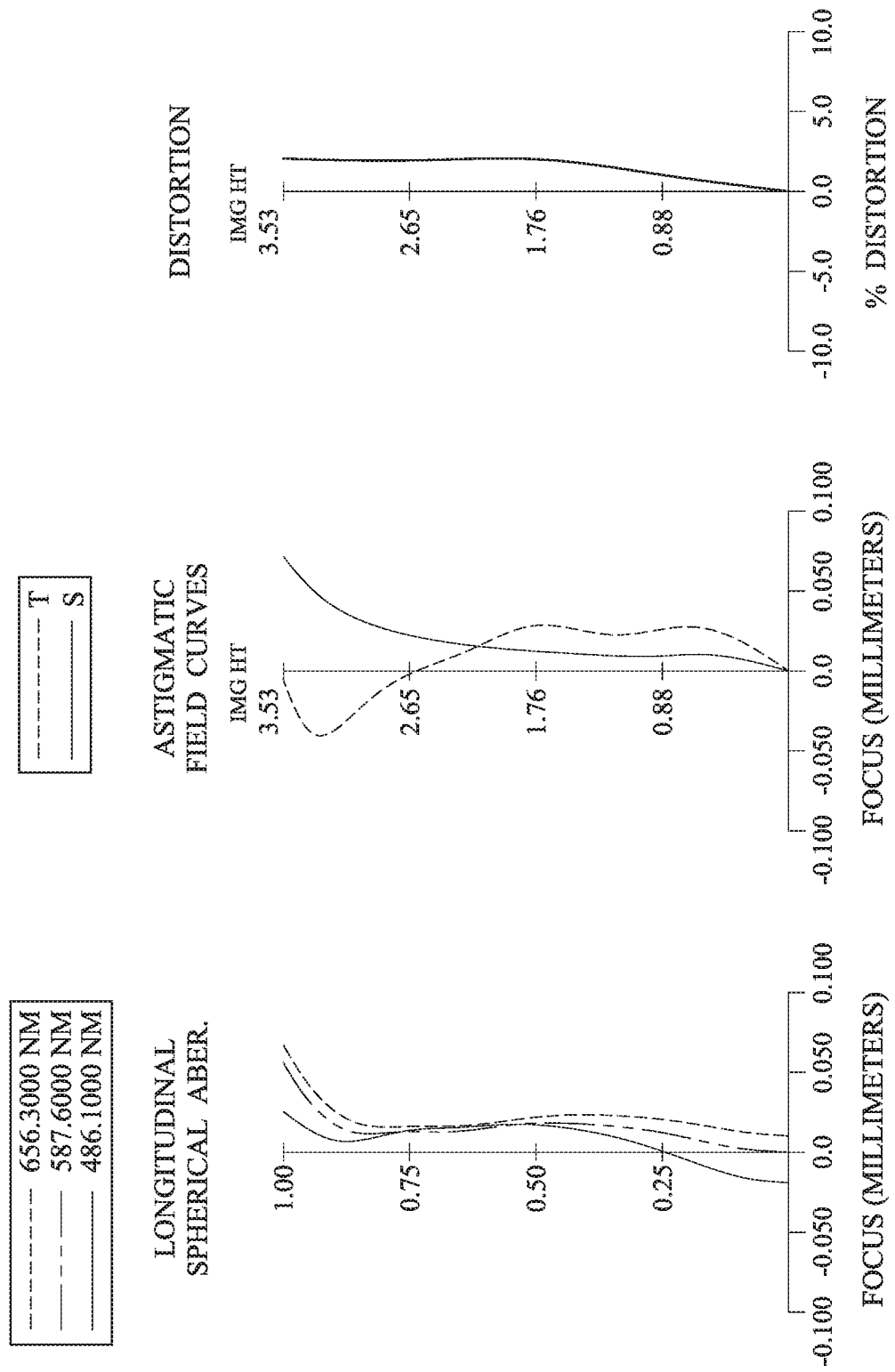
FIG. 8 shows spherical aberration curves, astigmatic field curves and a distortion curve of the imaging apparatus according to the 4th embodiment.

FIG. 7 is a schematic view of an imaging apparatus according to the 4th embodiment of the present disclosure. FIG. 8 shows spherical aberration curves, astigmatic field curves and a distortion curve of the imaging apparatus according to the 4th embodiment. In FIG. 7, the imaging apparatus includes a photographing optical lens assembly (its reference numeral is omitted) and an image sensor 495. The photographing optical lens assembly includes, in order from an object side to an image side, a first lens element 410, an aperture stop 400, a second lens element 420, a third lens element 430, a stop 405, a fourth lens element 440, a fifth lens element 450, a sixth lens element 460, a seventh lens element 470, an IR-cut filter 480, and an image surface 490, wherein the image sensor 495 is disposed on the image surface 490 of the photographing optical lens assembly. The photographing optical lens assembly includes seventh lens elements (410, 420, 430, 440, 450, 460, 470) without additional one or more lens elements inserted between the first lens element 410 and the seventh lens element 470.

The first lens element 410 with positive refractive power has an object-side surface 411 being convex in a paraxial region thereof and an image-side surface 412 being concave in a paraxial region thereof. The first lens element 410 is made of a plastic material, and has the object-side surface 411 and the image-side surface 412 being both aspheric.

The second lens element 420 with positive refractive power has an object-side surface 421 being convex in a paraxial region thereof and an image-side surface 422 being concave in a paraxial region thereof. The second lens element 420 is made of a plastic material, and has the object-side surface 421 and the image-side surface 422 being both aspheric.

The third lens element 430 with negative refractive power has an object-side surface 431 being convex in a paraxial region thereof and an image-side surface 432 being concave in a paraxial region thereof. The third lens element 430 is made of a plastic material, and has the object-side surface 431 and the image-side surface 432 being both aspheric.

The fourth lens element 440 with negative refractive power has an object-side surface 441 being convex in a paraxial region thereof and an image-side surface 442 being concave in a paraxial region thereof. The fourth lens element 440 is made of a plastic material, and has the object-side surface 441 and the image-side surface 442 being both aspheric.

The fifth lens element 450 with negative refractive power has an object-side surface 451 being convex in a paraxial region thereof and an image-side surface 452 being concave in a paraxial region thereof. The fifth lens element 450 is made of a plastic material, and has the object-side surface 451 and the image-side surface 452 being both aspheric.

The sixth lens element 460 with positive refractive power has an object-side surface 461 being convex in a paraxial region thereof and an image-side surface 462 being convex in a paraxial region thereof. The sixth lens element 460 is made of a plastic material, and has the object-side surface 461 and the image-side surface 462 being both aspheric.

The seventh lens element 470 with negative refractive power has an object-side surface 471 being concave in a paraxial region thereof and an image-side surface 472 being concave in a paraxial region thereof. The seventh lens element 470 is made of a plastic material, and has the object-side surface 471 and the image-side surface 472 being both aspheric. Furthermore, the image-side surface 472 of the seventh lens element 470 includes at least one convex critical point in an off-axis region thereof.

The IR-cut filter 480 is made of a glass material, which is located between the seventh lens element 470 and the image surface 490, and will not affect the focal length of the photographing optical lens assembly.

The detailed optical data of the 4th embodiment are shown in Table 7 and the aspheric surface data are shown in Table 8 below.

TABLE 7

4th Embodiment
f = 4.39 mm, Fno = 1.72, HFOV = 38.2 deg.

| Surface # | | Curvature Radius | | Thickness | Material | Index | Abbe # | Focal Length |
|---|---|---|---|---|---|---|---|---|
| 0 | Object | Plano | | Infinity | | | | |
| 1 | Lens 1 | 2.111 | ASP | 0.415 | Plastic | 1.549 | 56.0 | 10.77 |
| 2 | | 3.054 | ASP | 0.333 | | | | |
| 3 | Ape. Stop | Plano | | −0.283 | | | | |
| 4 | Lens 2 | 2.598 | ASP | 0.557 | Plastic | 1.545 | 56.1 | 6.69 |
| 5 | | 8.361 | ASP | 0.081 | | | | |
| 6 | Lens 3 | 5.941 | ASP | 0.230 | Plastic | 1.669 | 19.5 | −11.95 |
| 7 | | 3.355 | ASP | 0.211 | | | | |
| 8 | Stop | Plano | | 0.197 | | | | |
| 9 | Lens 4 | 8.765 | ASP | 0.438 | Plastic | 1.544 | 56.0 | −71.09 |

TABLE 7-continued

4th Embodiment
f = 4.39 mm, Fno = 1.72, HFOV = 38.2 deg.

| Surface # | | Curvature Radius | | Thickness | Material | Index | Abbe # | Focal Length |
|---|---|---|---|---|---|---|---|---|
| 10 | | 7.020 | ASP | 0.160 | | | | |
| 11 | Lens 5 | 10.146 | ASP | 0.285 | Plastic | 1.669 | 19.5 | −24.89 |
| 12 | | 6.233 | ASP | 0.238 | | | | |
| 13 | Lens 6 | 11.786 | ASP | 0.728 | Plastic | 1.544 | 56.0 | 2.24 |
| 14 | | −1.327 | ASP | 0.342 | | | | |
| 15 | Lens 7 | −3.102 | ASP | 0.476 | Plastic | 1.534 | 55.9 | −2.06 |
| 16 | | 1.799 | ASP | 0.500 | | | | |
| 17 | IR-cut filter | Plano | | 0.210 | Glass | 1.517 | 64.2 | — |
| 18 | | Plano | | 0.413 | | | | |
| 19 | Image | Plano | | — | | | | |

Reference wavelength is 587.6 nm (d-line).
Effective radius of Surface 8 is 1.085 mm

TABLE 8

Aspheric Coefficients

| | Surface # | | | | | | |
|---|---|---|---|---|---|---|---|
| | 1 | 2 | 4 | 5 | 6 | 7 | 9 |
| k = | −1.0371E−01 | 1.9619E+00 | −6.7246E−01 | 1.1316E+01 | −1.6307E+01 | 1.4802E+00 | −5.6064E+00 |
| A4 = | −6.8580E−03 | −3.5619E−02 | −1.5625E−02 | −1.6818E−01 | −2.3024E−01 | −1.3954E−01 | −1.0917E−01 |
| A6 = | 8.2684E−03 | 1.2555E−02 | −7.5342E−03 | 2.2222E−01 | 4.1153E−01 | 2.5553E−01 | 2.6479E−02 |
| A8 = | −1.6881E−02 | −6.7304E−03 | 2.5142E−02 | −2.2266E−01 | −3.7483E−01 | −2.0317E−01 | −5.8588E−02 |
| A10 = | 1.4224E−02 | 1.9027E−02 | −9.5071E−03 | 1.4856E−01 | 2.1537E−01 | 8.7452E−02 | 4.9664E−02 |
| A12 = | −4.0906E−03 | −6.5724E−03 | 3.0455E−03 | −5.9250E−02 | −6.8875E−02 | −1.3727E−02 | −4.0366E−02 |
| A14 = | | | −5.4797E−04 | 1.0322E−02 | 8.8471E−03 | | 1.1427E−02 |

| | Surface # | | | | | | |
|---|---|---|---|---|---|---|---|
| | 10 | 11 | 12 | 13 | 14 | 15 | 16 |
| k = | −5.5480E+01 | −7.7572E+01 | −7.7915E+01 | −1.3596E+01 | −6.0526E+00 | −1.9603E+00 | −1.0101E+01 |
| A4 = | −1.5077E−01 | −3.0543E−01 | −2.4527E−01 | −5.5669E−02 | −1.0392E−01 | −4.3382E−02 | −6.0019E−02 |
| A6 = | 1.0381E−01 | 2.8258E−01 | 1.9156E−01 | 7.3966E−02 | 1.6719E−01 | −2.6184E−02 | 1.5890E−02 |
| A8 = | −2.6508E−01 | −5.3709E−01 | −3.1246E−01 | −1.8955E−01 | −1.8599E−01 | 7.4958E−03 | −2.8503E−03 |
| A10 = | 3.5725E−01 | 7.2223E−01 | 3.6911E−01 | 1.9316E−01 | 1.0842E−01 | 7.6421E−03 | 1.3223E−04 |
| A12 = | −3.1224E−01 | −5.6101E−01 | −2.3011E−01 | −9.9584E−02 | −3.3202E−02 | −4.0149E−03 | 6.8705E−05 |
| A14 = | 1.5261E−01 | 2.3334E−01 | 7.0202E−02 | 2.6019E−02 | 5.3460E−03 | 7.8811E−04 | −1.7773E−05 |
| A16 = | −3.0287E−02 | −3.9746E−02 | −8.1771E−03 | −2.9620E−03 | −4.0626E−04 | −7.2112E−05 | 1.7605E−06 |
| A18 = | | | | 7.8399E−05 | 9.5845E−06 | 2.5748E−06 | −6.3344E−08 |

In the 4th embodiment, the equation of the aspheric surface profiles of the aforementioned lens elements is the same as the equation of the 1st embodiment. Also, the definitions of these parameters shown in the following table are the same as those stated in the 1st embodiment with corresponding values for the 4th embodiment, so an explanation in this regard will not be provided again.

Moreover, these parameters can be calculated from Table 7 and Table 8 as the following values and satisfy the following conditions:

| 4th Embodiment | | | |
|---|---|---|---|
| f [mm] | 4.39 | T12/ET12 | 0.80 |
| f/EPD | 1.72 | |R1|/R3 | 0.81 |
| HFOV [deg.] | 38.2 | (R11 + R12)/(R11 − R12) | 0.80 |
| FOV [deg.] | 76.4 | f/R10 | 0.70 |
| Nmax | 1.67 | |f1/f2| | 1.61 |
| V20 | 2 | |f2/f3| | 0.56 |
| V3 + V4 + V5 | 94.90 | |f3/f1| | 1.11 |
| TL/EPD | 2.17 | |f6/f4| | 0.03 |
| TL/ImgH | 1.57 | |f6/f5| | 0.09 |
| CT2/CT1 | 1.34 | |f7/f6| | 0.92 |
| (CT2 + CT6)/(CT3 + CT5) | 2.50 | |f/f3|+|f/f4|+|f/f5| | 0.60 |
| CT5/CT4 | 0.65 | f/f6 | 1.96 |
| ΣCT/ΣAT | 2.45 | |f/f6|+|f/f7| | 4.09 |

5th Embodiment

Figure 9:
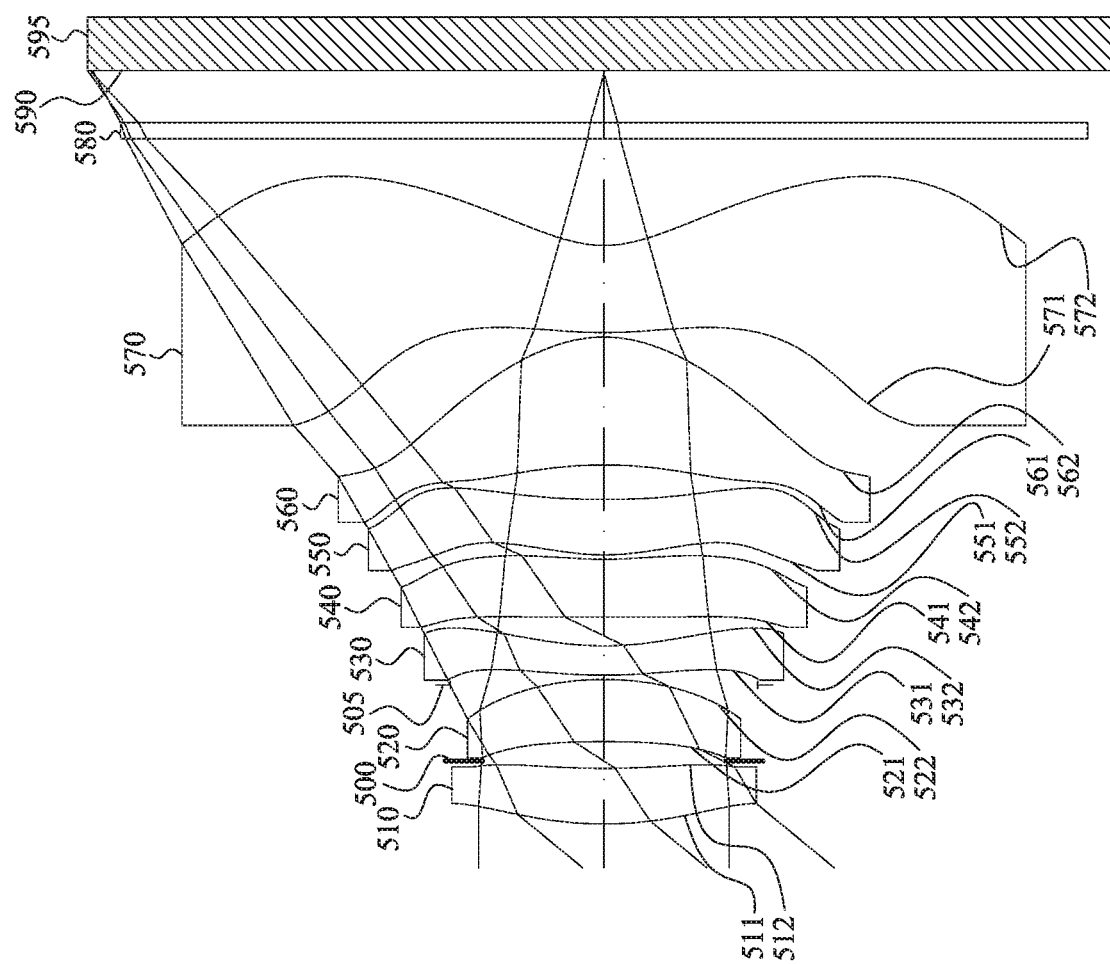
FIG. 9 is a schematic view of an imaging apparatus according to the 5th embodiment of the present disclosure.
Figure 10:
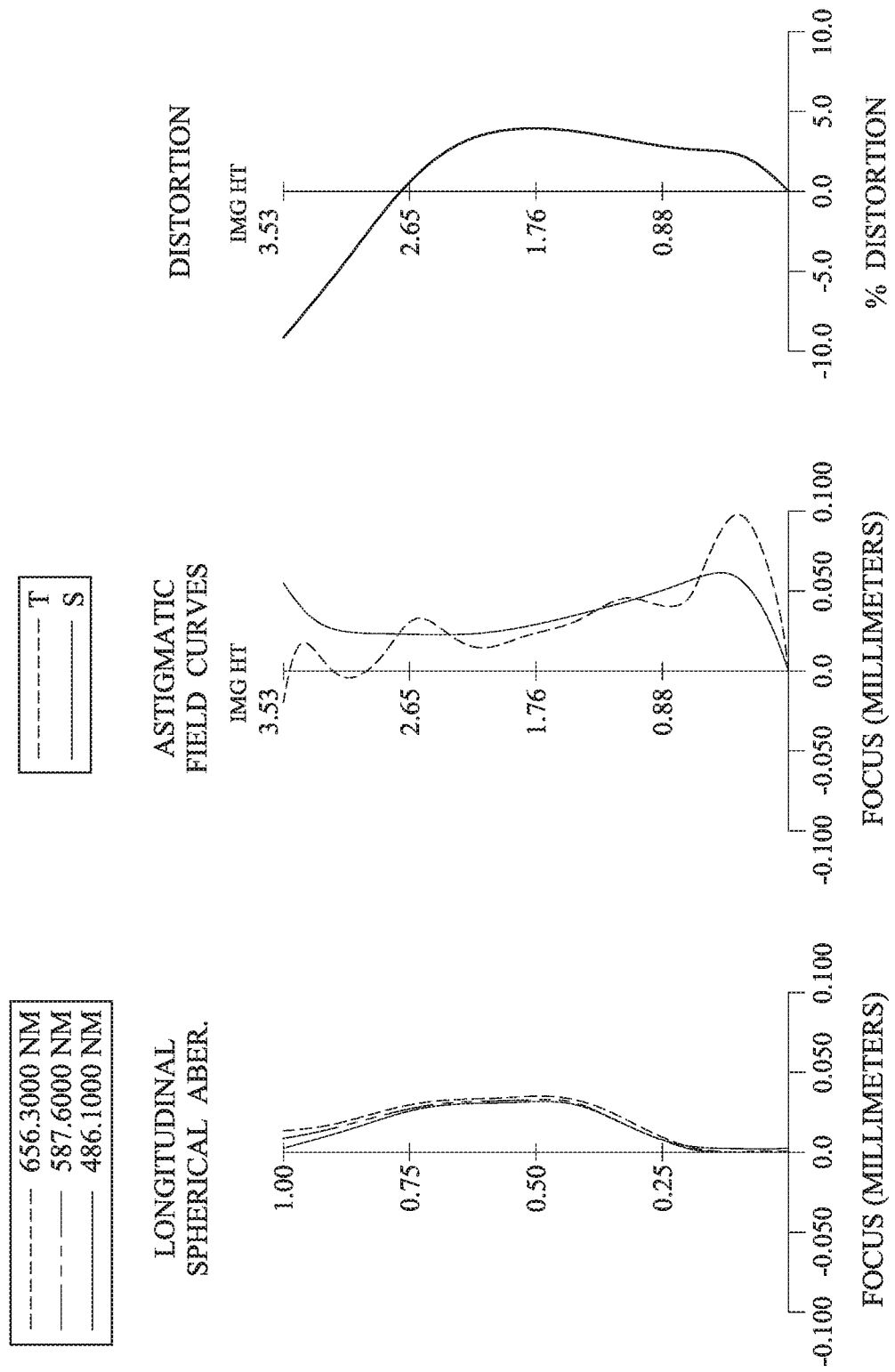
FIG. 10 shows spherical aberration curves, astigmatic field curves and a distortion curve of the imaging apparatus according to the 5th embodiment.

FIG. 9 is a schematic view of an imaging apparatus according to the 5th embodiment of the present disclosure. FIG. 10 shows spherical aberration curves, astigmatic field curves and a distortion curve of the imaging apparatus according to the 5th embodiment. In FIG. 9, the imaging apparatus includes a photographing optical lens assembly (its reference numeral is omitted) and an image sensor 595. The photographing optical lens assembly includes, in order from an object side to an image side, a first lens element 510, an aperture stop 500, a second lens element 520, a stop 505, a third lens element 530, a fourth lens element 540, a fifth lens element 550, a sixth lens element 560, a seventh lens element 570, an IR-cut filter 580, and an image surface 590, wherein the image sensor 595 is disposed on the image surface 590 of the photographing optical lens assembly. The photographing optical lens assembly includes seventh lens elements (510, 520, 530, 540, 550, 560, 570) without additional one or more lens elements inserted between the first lens element 510 and the seventh lens element 570.

The first lens element 510 with positive refractive power has an object-side surface 511 being convex in a paraxial region thereof and an image-side surface 512 being concave in a paraxial region thereof. The first lens element 510 is made of a plastic material, and has the object-side surface 511 and the image-side surface 512 being both aspheric.

The second lens element 520 with positive refractive power has an object-side surface 521 being concave in a paraxial region thereof and an image-side surface 522 being convex in a paraxial region thereof. The second lens element 520 is made of a plastic material, and has the object-side surface 521 and the image-side surface 522 being both aspheric.

The third lens element 530 with negative refractive power has an object-side surface 531 being convex in a paraxial region thereof and an image-side surface 532 being concave in a paraxial region thereof. The third lens element 530 is made of a plastic material, and has the object-side surface 531 and the image-side surface 532 being both aspheric.

The fourth lens element 540 with negative refractive power has an object-side surface 541 being convex in a paraxial region thereof and an image-side surface 542 being concave in a paraxial region thereof. The fourth lens element 540 is made of a plastic material, and has the object-side surface 541 and the image-side surface 542 being both aspheric.

The fifth lens element 550 with positive refractive power has an object-side surface 551 being convex in a paraxial region thereof and an image-side surface 552 being concave in a paraxial region thereof. The fifth lens element 550 is made of a plastic material, and has the object-side surface 551 and the image-side surface 552 being both aspheric.

The sixth lens element 560 with positive refractive power has an object-side surface 561 being concave in a paraxial region thereof and an image-side surface 562 being convex in a paraxial region thereof. The sixth lens element 560 is made of a plastic material, and has the object-side surface 561 and the image-side surface 562 being both aspheric.

The seventh lens element 570 with negative refractive power has an object-side surface 571 being convex in a paraxial region thereof and an image-side surface 572 being concave in a paraxial region thereof. The seventh lens element 570 is made of a plastic material, and has the object-side surface 571 and the image-side surface 572 being both aspheric. Furthermore, the image-side surface 572 of the seventh lens element 570 includes at least one convex critical point in an off-axis region thereof.

The IR-cut filter 580 is made of a glass material, which is located between the seventh lens element 570 and the image surface 590, and will not affect the focal length of the photographing optical lens assembly.

The detailed optical data of the 5th embodiment are shown in Table 9 and the aspheric surface data are shown in Table 10 below.

TABLE 9

5th Embodiment
f = 3.19 mm, Fno = 1.86, HFOV = 50.5 deg.

| Surface # | | Curvature Radius | | Thickness | Material | Index | Abbe # | Focal Length |
|---|---|---|---|---|---|---|---|---|
| 0 | Object | Plano | | Infinity | | | | |
| 1 | Lens 1 | 2.535 | ASP | 0.380 | Plastic | 1.544 | 56.0 | 8.60 |
| 2 | | 5.243 | ASP | 0.050 | | | | |
| 3 | Ape. Stop | Plano | | 0.133 | | | | |
| 4 | Lens 2 | −6.648 | ASP | 0.425 | Plastic | 1.544 | 56.0 | 5.12 |
| 5 | | −2.006 | ASP | −0.038 | | | | |
| 6 | Stop | Plano | | 0.068 | | | | |
| 7 | Lens 3 | 3.829 | ASP | 0.200 | Plastic | 1.700 | 17.9 | −7.48 |
| 8 | | 2.164 | ASP | 0.196 | | | | |
| 9 | Lens 4 | 56.628 | ASP | 0.396 | Plastic | 1.559 | 40.4 | −5.00 |
| 10 | | 2.656 | ASP | 0.030 | | | | |
| 11 | Lens 5 | 1.570 | ASP | 0.379 | Plastic | 1.544 | 56.0 | 3.85 |
| 12 | | 5.737 | ASP | 0.236 | | | | |
| 13 | Lens 6 | −2.919 | ASP | 0.875 | Plastic | 1.544 | 56.0 | 2.18 |
| 14 | | −0.932 | ASP | 0.030 | | | | |
| 15 | Lens 7 | 2.694 | ASP | 0.597 | Plastic | 1.559 | 40.4 | −2.26 |
| 16 | | 0.791 | ASP | 0.729 | | | | |
| 17 | IR-cut filter | Plano | | 0.110 | Glass | 1.517 | 64.2 | — |
| 18 | | Plano | | 0.357 | | | | |
| 19 | Image | Plano | | — | | | | |

Reference wavelength is 587.6 nm (d-line).
Effective radius of Surface 1 is 1.040 mm.
Effective radius of Surface 6 is 1.050 mm.

TABLE 10

Aspheric Coefficients

| | Surface # | | | | | | |
|---|---|---|---|---|---|---|---|
| | 1 | 2 | 4 | 5 | 7 | 8 | 9 |
| k = | −3.6728E+00 | −1.2715E+01 | 6.7890E−01 | −4.8302E+00 | −3.0062E+01 | −5.9389E+00 | 9.9000E+01 |
| A4 = | 1.9482E−02 | −6.8755E−02 | −5.4380E−02 | 3.8866E−02 | 4.4941E−02 | −8.4901E−02 | −4.7672E−02 |
| A6 = | −2.9430E−01 | 7.1212E−02 | −5.9484E−01 | −1.0237E+00 | −6.7146E−01 | 1.8589E−01 | 2.3429E−01 |
| A8 = | 1.6178E+00 | −7.1568E−01 | 4.5272E+00 | 4.2948E+00 | 1.9957E+00 | −9.1708E−01 | −5.9977E−01 |
| A10 = | −5.7957E+00 | 2.2182E+00 | −2.3011E+01 | −1.3171E+01 | −4.2536E+00 | 2.4799E+00 | 1.1705E+00 |
| A12 = | 1.2712E+01 | −3.5659E+00 | 7.2770E+01 | 2.9957E+01 | 7.1202E+00 | −3.9537E+00 | −2.0712E+00 |
| A14 = | −1.7328E+01 | 2.2195E+00 | −1.4353E+02 | −4.7848E+01 | −9.1040E+00 | 3.8852E+00 | 2.6110E+00 |
| A16 = | 1.4242E+01 | 1.3092E+00 | 1.7223E+02 | 4.9329E+01 | 7.9012E+00 | −2.3320E+00 | −1.9987E+00 |
| A18 = | −6.4516E+00 | −2.5795E+00 | −1.1523E+02 | −2.9066E+01 | −4.0220E+00 | 7.8100E−01 | 8.1944E−01 |
| A20 = | 1.2368E+00 | 1.0250E+00 | 3.2974E+01 | 7.3758E+00 | 8.9233E−01 | −1.1117E−01 | −1.3715E−01 |

| | Surface # | | | | | | |
|---|---|---|---|---|---|---|---|
| | 10 | 11 | 12 | 13 | 14 | 15 | 16 |
| k = | −4.4241E+01 | −1.9550E+01 | −5.7018E+01 | −4.9295E+00 | −1.3814E+00 | −9.7797E+01 | −4.1421E+00 |
| A4 = | −3.3048E−01 | 1.6938E−02 | 1.1612E−01 | −2.1233E−03 | 5.0961E−02 | −1.3474E−02 | −7.9407E−02 |
| A6 = | 6.8277E−01 | −4.0114E−01 | −2.0825E−01 | 5.1161E−02 | 7.1218E−02 | −1.4272E−01 | 3.9600E−02 |
| A8 = | −1.2151E+00 | 9.4919E−01 | 2.5143E−01 | −5.3424E−02 | −3.3300E−01 | 1.6365E−01 | −1.6032E−02 |
| A10 = | 1.7375E+00 | −1.7448E+00 | −3.5339E−01 | 2.3682E−01 | 4.7160E−01 | −1.0340E−01 | 4.6220E−03 |
| A12 = | −1.9523E+00 | 1.9654E+00 | 4.0498E−01 | −3.6038E−01 | −3.5659E−01 | 3.6611E−02 | −9.4480E−04 |
| A14 = | 1.5269E+00 | −1.3134E+00 | −2.9982E−01 | 2.4361E−01 | 1.5964E−01 | −6.9411E−03 | 1.3299E−04 |
| A16 = | −7.5299E−01 | 5.2116E−01 | 1.2620E−01 | −8.6298E−02 | −4.1951E−02 | 6.1374E−04 | −1.2212E−05 |
| A18 = | 2.0844E−01 | −1.1471E−01 | −2.7205E−02 | 1.5928E−02 | 5.9470E−03 | −9.9978E−06 | 6.5576E−07 |
| A20 = | −2.4522E−02 | 1.0818E−02 | 2.3306E−03 | −1.2188E−03 | −3.5016E−04 | −1.2107E−06 | −1.5508E−08 |

In the 5th embodiment, the equation of the aspheric surface profiles of the aforementioned lens elements is the same as the equation of the 1st embodiment. Also, the definitions of these parameters shown in the following table are the same as those stated in the 1st embodiment with corresponding values for the 5th embodiment, so an explanation in this regard will not be provided again.

Moreover, these parameters can be calculated from Table 9 and Table 10 as the following values and satisfy the following conditions:

| 5th Embodiment | | | |
|---|---|---|---|
| f [mm] | 3.19 | T12/ET12 | 2.95 |
| f/EPD | 1.86 | |R1|/R3 | −0.38 |
| HFOV [deg.] | 50.5 | (R11 + R12)/(R11 − R12) | 1.94 |
| FOV [deg.] | 101.0 | f/R10 | 0.56 |
| Nmax | 1.70 | |f1/f2| | 1.68 |
| V20 | 1 | |f2/f3| | 0.68 |
| V3 + V4 + V5 | 114.33 | |f3/f1| | 0.87 |
| TL/EPD | 3.01 | |f6/f4| | 0.44 |
| TL/ImgH | 1.46 | |f6/f5| | 0.57 |
| CT2/CT1 | 1.12 | |f7/f6| | 1.04 |
| (CT2 + CT6)/(CT3 + CT5) | 2.25 | |f/f3| + |f/f4| + |f/f5| | 1.89 |
| CT5/CT4 | 0.96 | f/f6 | 1.46 |
| ΣCT/ΣAT | 4.61 | |f/f6| + |f/f7| | 2.87 |

6th Embodiment

Figure 11:
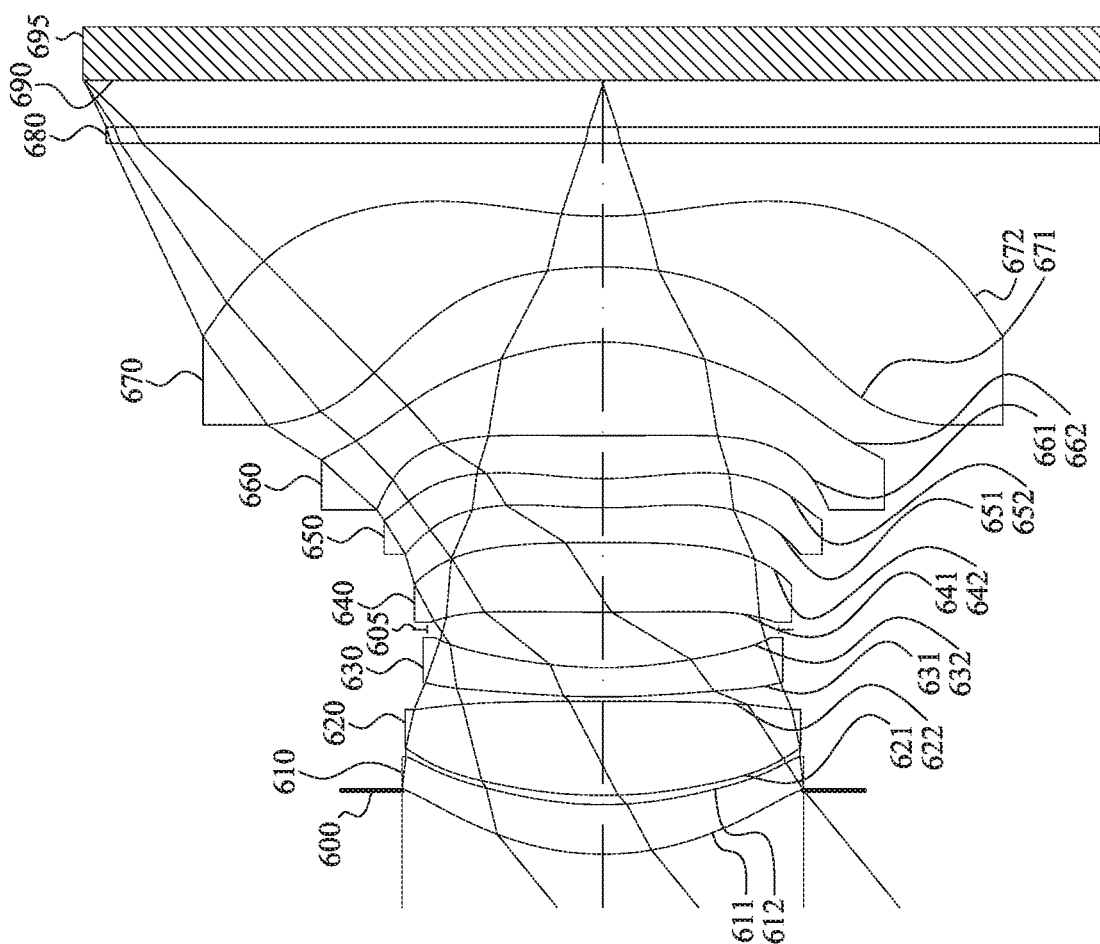
FIG. 11 is a schematic view of an imaging apparatus according to the 6th embodiment of the present disclosure.
Figure 12:
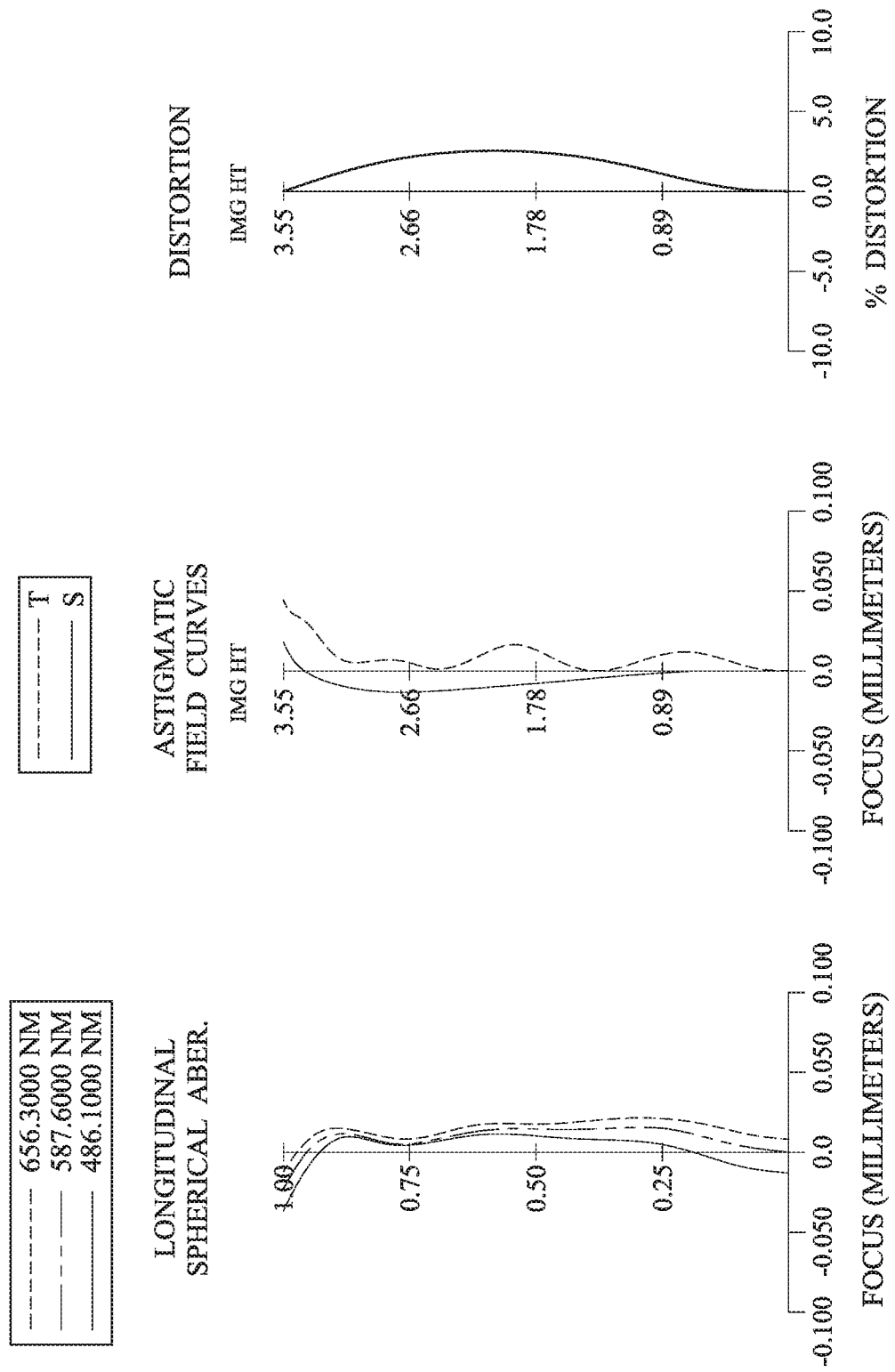
FIG. 12 shows spherical aberration curves, astigmatic field curves and a distortion curve of the imaging apparatus according to the 6th embodiment.

FIG. 11 is a schematic view of an imaging apparatus according to the 6th embodiment of the present disclosure. FIG. 12 shows spherical aberration curves, astigmatic field curves and a distortion curve of the imaging apparatus according to the 6th embodiment. In FIG. 11, the imaging apparatus includes a photographing optical lens assembly (its reference numeral is omitted) and an image sensor 695. The photographing optical lens assembly includes, in order from an object side to an image side, an aperture stop 600, a first lens element 610, a second lens element 620, a third lens element 630, a stop 605, a fourth lens element 640, a fifth lens element 650, a sixth lens element 660, a seventh lens element 670, an IR-cut filter 680, and an image surface 690, wherein the image sensor 695 is disposed on the image surface 690 of the photographing optical lens assembly. The photographing optical lens assembly includes seventh lens elements (610, 620, 630, 640, 650, 660, 670) without additional one or more lens elements inserted between the first lens element 610 and the seventh lens element 670.

The first lens element 610 with positive refractive power has an object-side surface 611 being convex in a paraxial region thereof and an image-side surface 612 being concave in a paraxial region thereof. The first lens element 610 is made of a plastic material, and has the object-side surface 611 and the image-side surface 612 being both aspheric.

The second lens element 620 with positive refractive power has an object-side surface 621 being convex in a paraxial region thereof and an image-side surface 622 being convex in a paraxial region thereof. The second lens element 620 is made of a plastic material, and has the object-side surface 621 and the image-side surface 622 being both aspheric.

The third lens element 630 with negative refractive power has an object-side surface 631 being convex in a paraxial region thereof and an image-side surface 632 being concave in a paraxial region thereof. The third lens element 630 is made of a plastic material, and has the object-side surface 631 and the image-side surface 632 being both aspheric.

The fourth lens element 640 with positive refractive power has an object-side surface 641 being convex in a paraxial region thereof and an image-side surface 642 being convex in a paraxial region thereof. The fourth lens element 640 is made of a plastic material, and has the object-side surface 641 and the image-side surface 642 being both aspheric.

The fifth lens element 650 with negative refractive power has an object-side surface 651 being convex in a paraxial region thereof and an image-side surface 652 being concave in a paraxial region thereof. The fifth lens element 650 is made of a plastic material, and has the object-side surface 651 and the image-side surface 652 being both aspheric.

The sixth lens element 660 with positive refractive power has an object-side surface 661 being convex in a paraxial region thereof and an image-side surface 662 being convex in a paraxial region thereof. The sixth lens element 660 is made of a plastic material, and has the object-side surface 661 and the image-side surface 662 being both aspheric.

The seventh lens element 670 with negative refractive power has an object-side surface 671 being concave in a paraxial region thereof and an image-side surface 672 being concave in a paraxial region thereof. The seventh lens element 670 is made of a plastic material, and has the object-side surface 671 and the image-side surface 672 being both aspheric. Furthermore, the image-side surface 672 of the seventh lens element 670 includes at least one convex critical point in an off-axis region thereof.

The IR-cut filter 680 is made of a glass material, which is located between the seventh lens element 670 and the image surface 690, and will not affect the focal length of the photographing optical lens assembly.

The detailed optical data of the 6th embodiment are shown in Table 11 and the aspheric surface data are shown in Table 12 below.

TABLE 11

6th Embodiment
f = 4.34 mm, Fno = 1.58, HFOV = 39.2 deg.

| Surface # | | Curvature Radius | | Thickness | Material | Index | Abbe # | Focal Length |
|---|---|---|---|---|---|---|---|---|
| 0 | Object | Plano | | Infinity | | | | |
| 1 | Ape. Stop | Plano | | −0.436 | | | | |
| 2 | Lens 1 | 1.919 | ASP | 0.339 | Plastic | 1.544 | 56.0 | 11.69 |
| 3 | | 2.578 | ASP | 0.063 | | | | |
| 4 | Lens 2 | 3.204 | ASP | 0.644 | Plastic | 1.544 | 56.0 | 5.72 |
| 5 | | −102.191 | ASP | 0.030 | | | | |
| 6 | Lens 3 | 4.956 | ASP | 0.200 | Plastic | 1.700 | 17.5 | −10.04 |
| 7 | | 2.858 | ASP | 0.261 | | | | |
| 8 | Stop | Plano | | 0.118 | | | | |
| 9 | Lens 4 | 18.729 | ASP | 0.478 | Plastic | 1.550 | 50.0 | 15.87 |
| 10 | | −16.194 | ASP | 0.236 | | | | |
| 11 | Lens 5 | 3.395 | ASP | 0.200 | Plastic | 1.700 | 17.5 | −15.05 |
| 12 | | 2.505 | ASP | 0.294 | | | | |
| 13 | Lens 6 | 46.308 | ASP | 0.640 | Plastic | 1.566 | 37.4 | 3.10 |
| 14 | | −1.814 | ASP | 0.513 | | | | |
| 15 | Lens 7 | −2.937 | ASP | 0.347 | Plastic | 1.544 | 56.0 | −2.41 |
| 16 | | 2.463 | ASP | 0.500 | | | | |
| 17 | IR-cut filter | Plano | | 0.110 | Glass | 1.517 | 64.2 | — |
| 18 | | Plano | | 0.319 | | | | |
| 19 | Image | Plano | | — | | | | |

Reference wavelength is 587.6 nm (d-line).
Effective radius of Surface 8 is 1.200 mm.
Effective radius of Surface 11 is 1.350 mm.

TABLE 12

Aspheric Coefficients

| | Surface # | | | | | | |
|---|---|---|---|---|---|---|---|
| | 2 | 3 | 4 | 5 | 6 | 7 | 9 |
| k = | −2.1602E−02 | 1.9929E−01 | −4.9764E−01 | 1.0000E+00 | 9.4520E−01 | 2.1400E−01 | −4.0000E+01 |
| A4 = | −6.2062E−03 | 4.7877E−03 | 8.5490E−03 | −3.3842E−02 | −1.0028E−01 | −8.0697E−02 | −2.0847E−02 |
| A6 = | −2.3620E−02 | −1.1989E−01 | −7.1938E−02 | 4.1997E−02 | 1.1300E−01 | 5.9821E−02 | −3.7578E−02 |
| A8 = | 1.5517E−02 | 1.1802E−01 | 2.7699E−02 | −3.5271E−02 | −9.2221E−02 | −1.8250E−02 | 4.9724E−02 |
| A10 = | −6.0719E−03 | −3.2299E−02 | 8.1904E−02 | 1.1706E−03 | 3.3025E−02 | −2.2933E−02 | −7.8218E−02 |
| A12 = | | | −8.3849E−02 | 9.0306E−03 | 8.9503E−03 | 3.5256E−02 | 5.2293E−02 |
| A14 = | | | 3.1661E−02 | −2.3823E−03 | −5.7063E−03 | −1.0657E−02 | −1.1889E−02 |
| A16 = | | | −4.5356E−03 | | | | |

| | Surface # | | | | | | |
|---|---|---|---|---|---|---|---|
| | 10 | 11 | 12 | 13 | 14 | 15 | 16 |
| k = | 1.0000E+00 | −1.3895E+01 | −2.1607E+01 | −4.0000E+01 | −3.1463E+00 | −9.5744E−01 | −1.1432E+01 |
| A4 = | −8.7134E−02 | −3.1864E−01 | −1.8347E−01 | −1.0946E−02 | 4.5892E−02 | −5.0250E−02 | −6.7964E−02 |
| A6 = | 1.1018E−01 | 3.5573E−01 | 9.8027E−02 | −1.2968E−02 | −3.7058E−02 | −3.2136E−02 | 1.6389E−02 |
| A8 = | −1.9430E−01 | −4.0762E−01 | −4.0658E−02 | −5.1283E−02 | −1.1724E−02 | 1.2384E−02 | −2.5822E−03 |
| A10 = | 1.9172E−01 | 3.8814E−01 | 8.8508E−03 | 5.4004E−02 | 1.2562E−02 | 3.5271E−03 | 1.8122E−04 |

TABLE 12-continued

| Aspheric Coefficients | | | | | | | |
|---|---|---|---|---|---|---|---|
| A12 = | −1.3883E−01 | −2.8107E−01 | −6.4143E−03 | −2.3398E−02 | −2.6357E−03 | −1.9793E−03 | 1.0241E−05 |
| A14 = | 6.1676E−02 | 1.1450E−01 | 2.2612E−03 | 3.7168E−03 | 1.2002E−04 | 2.9470E−04 | −3.7453E−06 |
| A16 = | −1.1786E−02 | −1.8595E−02 | | −1.1895E−04 | 7.6042E−06 | −1.4850E−05 | 2.4792E−07 |

In the 6th embodiment, the equation of the aspheric surface profiles of the aforementioned lens elements is the same as the equation of the 1st embodiment. Also, the definitions of these parameters shown in the following table are the same as those stated in the 1st embodiment with corresponding values for the 6th embodiment, so an explanation in this regard will not be provided again.

Moreover, these parameters can be calculated from Table 11 and Table 12 as the following values and satisfy the following conditions:

| 6th Embodiment | | | |
|---|---|---|---|
| f [mm] | 4.34 | T12/ET12 | 1.05 |
| f/EPD | 1.58 | |R1|/R3 | 0.60 |
| HFOV [deg.] | 39.2 | (R11 + R12)/(R11 − R12) | 0.92 |
| FOV [deg.] | 78.4 | f/R10 | 1.73 |
| Nmax | 1.70 | |f1/f2| | 2.04 |
| V20 | 2 | |f2/f3| | 0.57 |
| V3 + V4 + V5 | 85.00 | |f3/f1| | 0.86 |
| TL/EPD | 1.93 | |f6/f4| | 0.20 |
| TL/ImgH | 1.49 | |f6/f5| | 0.21 |
| CT2/CT1 | 1.90 | |f7/f6| | 0.78 |
| (CT2 + CT6)/(CT3 + CT5) | 3.21 | |f/f3| + |f/f4| + |f/f5| | 0.99 |
| CT5/CT4 | 0.42 | f/f6 | 1.40 |
| ΣCT/ΣAT | 1.88 | |f/f6| + |f/f7| | 3.20 |

7th Embodiment

Figure 13:
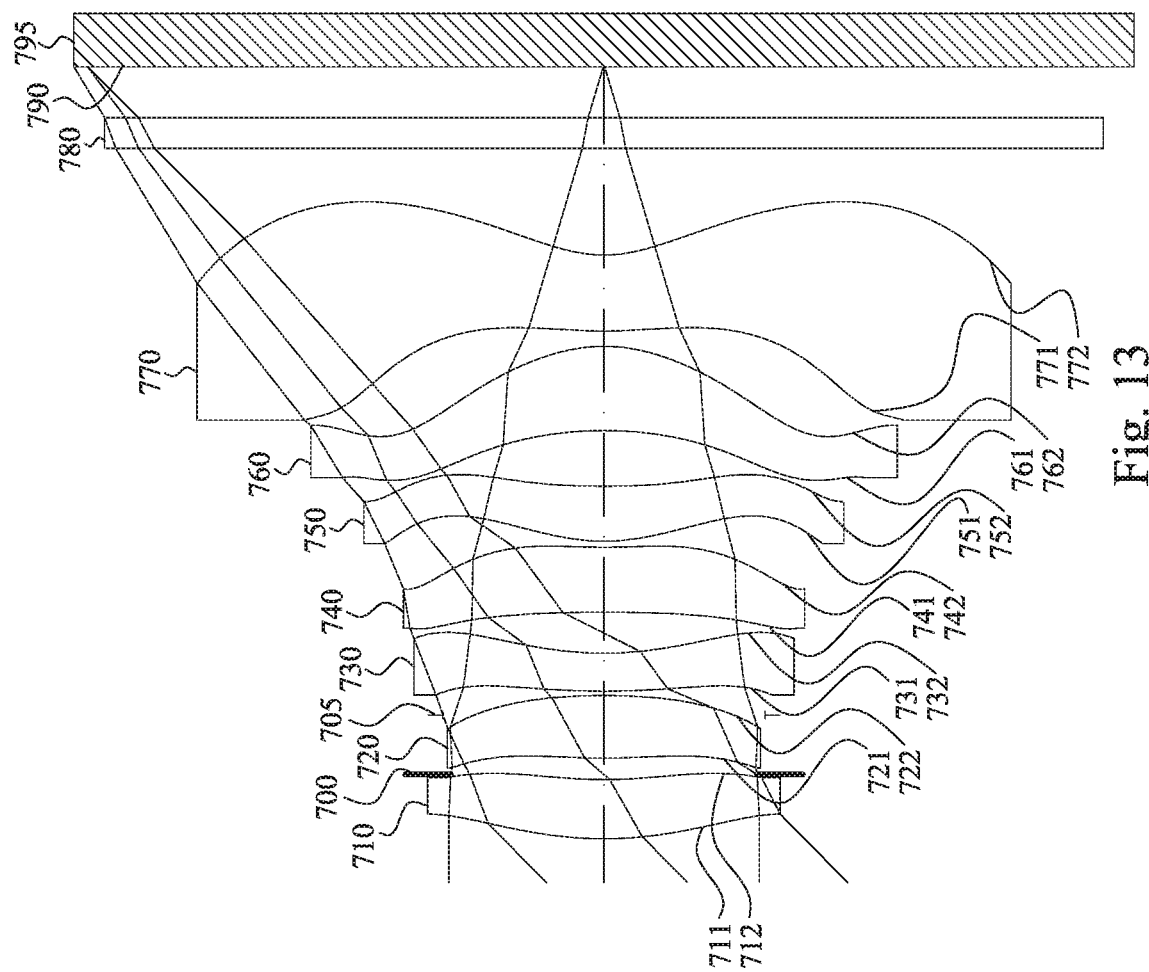
FIG. 13 is a schematic view of an imaging apparatus according to the 7th embodiment of the present disclosure.
Figure 14:
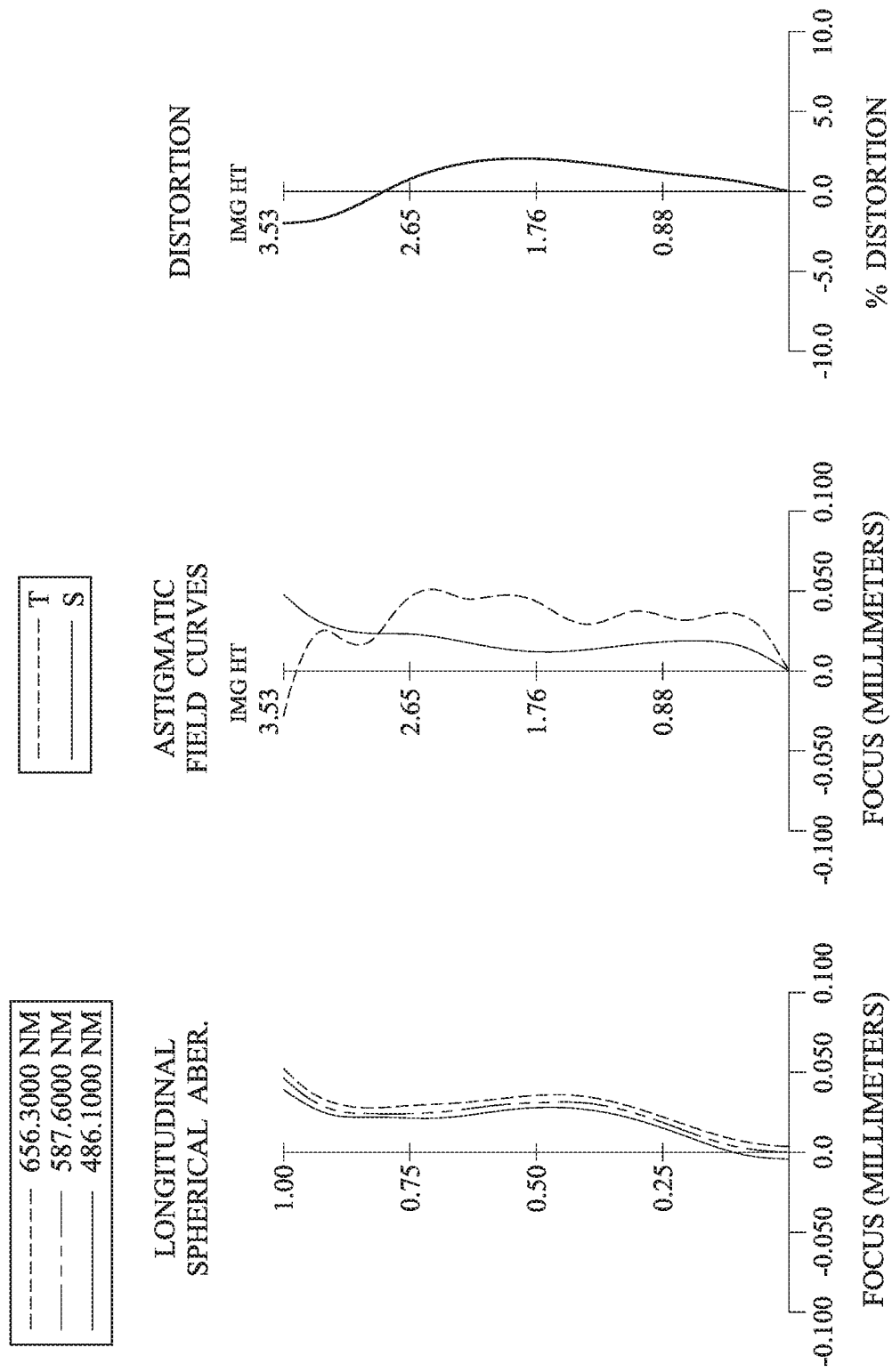
FIG. 14 shows spherical aberration curves, astigmatic field curves and a distortion curve of the imaging apparatus according to the 7th embodiment.

FIG. 13 is a schematic view of an imaging apparatus according to the 7th embodiment of the present disclosure. FIG. 14 shows spherical aberration curves, astigmatic field curves and a distortion curve of the imaging apparatus according to the 7th embodiment. In FIG. 13, the imaging apparatus includes a photographing optical lens assembly (its reference numeral is omitted) and an image sensor 795. The photographing optical lens assembly includes, in order from an object side to an image side, a first lens element 710, an aperture stop 700, a second lens element 720, a stop 705, a third lens element 730, a fourth lens element 740, a fifth lens element 750, a sixth lens element 760, a seventh lens element 770, an IR-cut filter 780, and an image surface 790, wherein the image sensor 795 is disposed on the image surface 790 of the photographing optical lens assembly. The photographing optical lens assembly includes seventh lens elements (710, 720, 730, 740, 750, 760, 770) without additional one or more lens elements inserted between the first lens element 710 and the seventh lens element 770.

The first lens element 710 with positive refractive power has an object-side surface 711 being convex in a paraxial region thereof and an image-side surface 712 being concave in a paraxial region thereof. The first lens element 710 is made of a plastic material, and has the object-side surface 711 and the image-side surface 712 being both aspheric.

The second lens element 720 with positive refractive power has an object-side surface 721 being convex in a paraxial region thereof and an image-side surface 722 being convex in a paraxial region thereof. The second lens element 720 is made of a plastic material, and has the object-side surface 721 and the image-side surface 722 being both aspheric.

The third lens element 730 with negative refractive power has an object-side surface 731 being convex in a paraxial region thereof and an image-side surface 732 being concave in a paraxial region thereof. The third lens element 730 is made of a plastic material, and has the object-side surface 731 and the image-side surface 732 being both aspheric.

The fourth lens element 740 with negative refractive power has an object-side surface 741 being concave in a paraxial region thereof and an image-side surface 742 being concave in a paraxial region thereof. The fourth lens element 740 is made of a plastic material, and has the object-side surface 741 and the image-side surface 742 being both aspheric.

The fifth lens element 750 with positive refractive power has an object-side surface 751 being convex in a paraxial region thereof and an image-side surface 752 being concave in a paraxial region thereof. The fifth lens element 750 is made of a plastic material, and has the object-side surface 751 and the image-side surface 752 being both aspheric.

The sixth lens element 760 with positive refractive power has an object-side surface 761 being concave in a paraxial region thereof and an image-side surface 762 being convex in a paraxial region thereof. The sixth lens element 760 is made of a plastic material, and has the object-side surface 761 and the image-side surface 762 being both aspheric.

The seventh lens element 770 with negative refractive power has an object-side surface 771 being convex in a paraxial region thereof and an image-side surface 772 being concave in a paraxial region thereof. The seventh lens element 770 is made of a plastic material, and has the object-side surface 771 and the image-side surface 772 being both aspheric. Furthermore, the image-side surface 772 of the seventh lens element 770 includes at least one convex critical point in an off-axis region thereof.

The IR-cut filter 780 is made of a glass material, which is located between the seventh lens element 770 and the image surface 790, and will not affect the focal length of the photographing optical lens assembly.

The detailed optical data of the 7th embodiment are shown in Table 13 and the aspheric surface data are shown in Table 14 below.

TABLE 13

7th Embodiment
f = 3.65 mm, Fno = 1.72, HFOV = 44.5 deg.

| Surface # | | Curvature Radius | | Thickness | Material | Index | Abbe # | Focal Length |
|---|---|---|---|---|---|---|---|---|
| 0 | Object | Plano | | Infinity | | | | |
| 1 | Lens 1 | 2.561 | ASP | 0.405 | Plastic | 1.545 | 56.1 | 19.39 |
| 2 | | 3.192 | ASP | 0.034 | | | | |
| 3 | Ape. Stop | Plano | | 0.113 | | | | |
| 4 | Lens 2 | 4.955 | ASP | 0.427 | Plastic | 1.544 | 56.0 | 4.43 |
| 5 | | −4.559 | ASP | −0.133 | | | | |
| 6 | Stop | Plano | | 0.163 | | | | |
| 7 | Lens 3 | 4.908 | ASP | 0.260 | Plastic | 1.669 | 19.5 | −7.06 |
| 8 | | 2.356 | ASP | 0.281 | | | | |
| 9 | Lens 4 | −11.314 | ASP | 0.443 | Plastic | 1.545 | 49.0 | −5.42 |
| 10 | | 4.054 | ASP | 0.042 | | | | |
| 11 | Lens 5 | 1.330 | ASP | 0.376 | Plastic | 1.544 | 56.0 | 2.99 |
| 12 | | 6.612 | ASP | 0.381 | | | | |
| 13 | Lens 6 | −2.478 | ASP | 0.576 | Plastic | 1.544 | 56.0 | 3.11 |
| 14 | | −1.088 | ASP | 0.105 | | | | |
| 15 | Lens 7 | 3.358 | ASP | 0.519 | Plastic | 1.545 | 50.0 | −2.35 |
| 16 | | 0.878 | ASP | 0.729 | | | | |
| 17 | IR-cut filter | Plano | | 0.210 | Glass | 1.517 | 64.2 | — |
| 18 | | Plano | | 0.348 | | | | |
| 19 | Image | Plano | | — | | | | |

Reference wavelength is 587.6 nm (d-line).
Effective radius of Surface 6 is 1.100 mm.

TABLE 14

Aspheric Coefficients

| | Surface # | | | | | | |
|---|---|---|---|---|---|---|---|
| | 1 | 2 | 4 | 5 | 7 | 8 | 9 |
| k = | −1.2788E+00 | −7.7699E+00 | −9.7676E−01 | −4.3580E+01 | 1.1274E+01 | −1.1999E+00 | 4.6293E+01 |
| A4 = | −3.7808E−02 | −1.1873E−01 | −1.6157E−01 | −1.3998E−01 | −9.0132E−02 | −6.7981E−02 | −2.8461E−02 |
| A6 = | 4.4607E−03 | −3.2644E−02 | −1.0173E−01 | 4.1276E−02 | 6.4753E−02 | 6.6826E−02 | 2.5464E−02 |
| A8 = | −1.5076E−02 | 5.3872E−02 | 1.8707E−01 | 2.5082E−02 | −1.2642E−01 | −1.5250E−01 | −2.2859E−02 |
| A10 = | 3.4326E−03 | −1.3632E−02 | −7.8182E−02 | −4.1550E−02 | 6.3608E−02 | 1.3002E−01 | −1.2740E−04 |
| A12 = | 6.3478E−05 | | | 9.3599E−03 | −1.1356E−02 | −5.7588E−02 | −3.8849E−03 |
| A14 = | | | | | | 1.0473E−02 | 1.1460E−02 |
| A16 = | | | | | | | −3.5278E−03 |

| | Surface # | | | | | | |
|---|---|---|---|---|---|---|---|
| | 10 | 11 | 12 | 13 | 14 | 15 | 16 |
| k = | −9.2880E+01 | −8.1026E+00 | 9.7011E+00 | −9.6436E+00 | −1.8420E+00 | −9.9000E+01 | −4.7760E+00 |
| A4 = | −3.8462E−01 | −9.8060E−03 | 1.6010E−01 | −4.7506E−02 | 9.8805E−02 | −7.8076E−02 | −9.0497E−02 |
| A6 = | 3.6754E−01 | −1.6363E−04 | −2.2764E−01 | −6.1851E−02 | −1.7169E−01 | −9.1079E−02 | 4.0635E−02 |
| A8 = | −3.3867E−01 | −1.7617E−01 | 2.9208E−02 | 5.7397E−02 | 1.1296E−01 | 1.3435E−01 | −1.2925E−02 |
| A10 = | 2.5570E−01 | 2.2307E−01 | 8.4445E−02 | 4.7627E−03 | −2.2473E−02 | −8.4227E−02 | 2.5230E−03 |
| A12 = | −1.4113E−01 | −1.2825E−01 | −6.6025E−02 | −1.3362E−02 | −1.5770E−03 | 2.6846E−02 | −2.9301E−04 |
| A14 = | 4.9681E−02 | 3.5643E−02 | 2.0496E−02 | 3.8789E−03 | 1.0048E−03 | −4.1441E−03 | 1.8453E−05 |
| A16 = | −7.2976E−03 | −3.7849E−03 | −2.3299E−03 | −3.6574E−04 | −8.8493E−05 | 2.4574E−04 | −4.8455E−07 |

In the 7th embodiment, the equation of the aspheric surface profiles of the aforementioned lens elements is the same as the equation of the 1st embodiment. Also, the definitions of these parameters shown in the following table are the same as those stated in the 1st embodiment with corresponding values for the 7th embodiment, so an explanation in this regard will not be provided again.

Moreover, these parameters can be calculated from Table 13 and Table 14 as the following values and satisfy the following conditions:

| 7th Embodiment | | | |
|---|---|---|---|
| f [mm] | 3.65 | T12/ET12 | 2.25 |
| f/EPD | 1.72 | \|R1\|/R3 | 0.52 |
| HFOV [deg.] | 44.5 | (R11 + R12)/(R11 − R12) | 2.57 |
| FOV [deg.] | 89.0 | f/R10 | 0.55 |
| Nmax | 1.67 | \|f1/f2\| | 4.37 |
| V20 | 1 | \|f2/f3\| | 0.63 |
| V3 + V4 + V5 | 124.43 | \|f3/f1\| | 0.36 |
| TL/EPD | 2.49 | \|f6/f4\| | 0.57 |
| TL/ImgH | 1.50 | \|f6/f5\| | 1.04 |
| CT2/CT1 | 1.05 | \|f7/f6\| | 0.76 |
| (CT2 + CT6)/(CT3 + CT5) | 1.58 | \|f/f3\| + \|f/f4\| + \|f/f5\| | 2.41 |
| CT5/CT4 | 0.85 | f/f6 | 1.17 |
| ΣCT/ΣAT | 3.05 | \|f/f6\| + \|f/f7\| | 2.72 |

8th Embodiment

Figure 16:
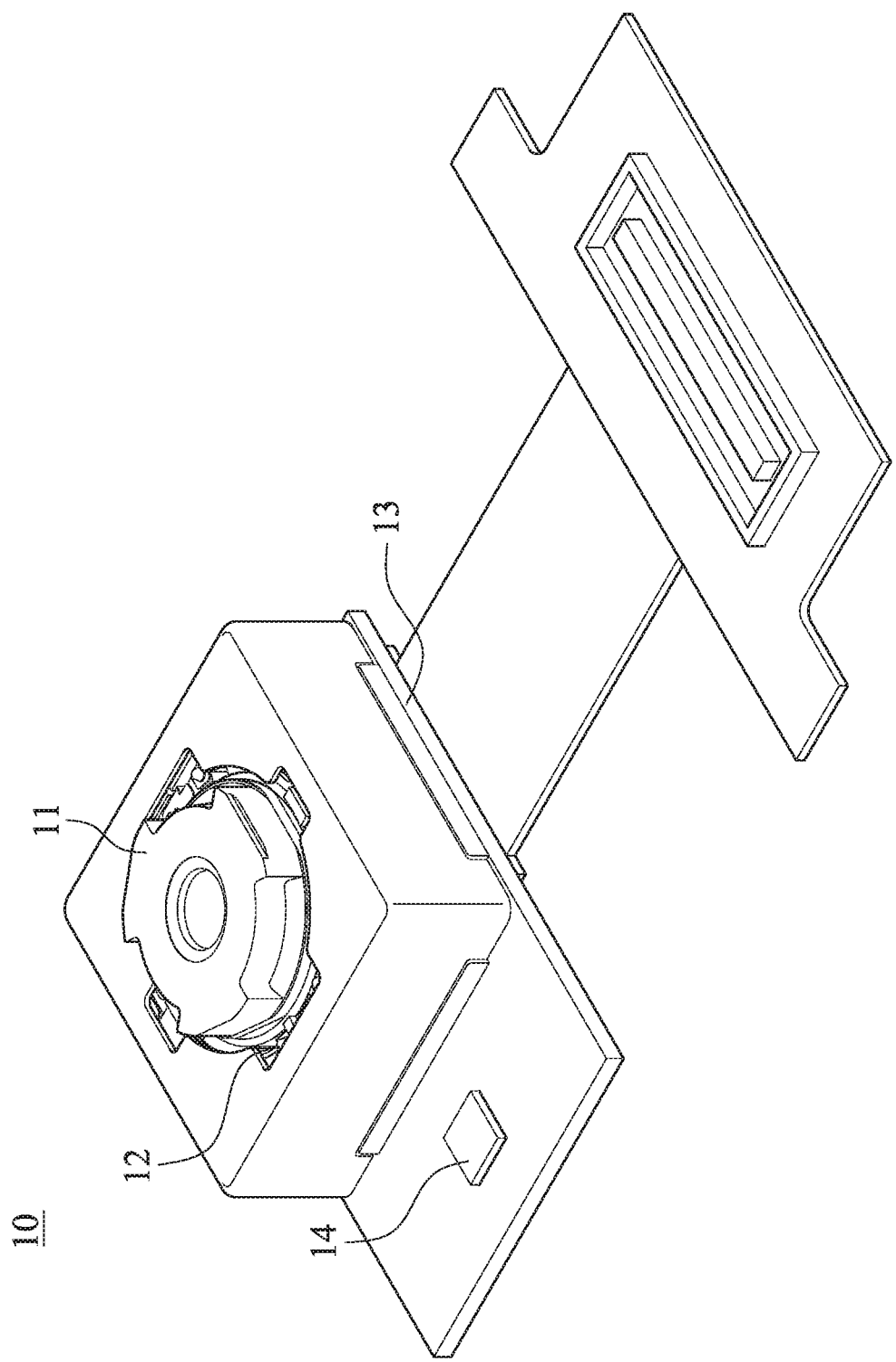
FIG. 16 is a three-dimensional schematic view of an imaging apparatus according to the 8th embodiment of the present disclosure.

FIG. 16 is a three-dimensional schematic view of an imaging apparatus 10 according to the 8th embodiment of the present disclosure. In FIG. 16, the imaging apparatus 10 of the 8th embodiment is a camera module, the imaging apparatus 10 includes an imaging lens assembly 11, a driving apparatus 12 and an image sensor 13, wherein the imaging lens assembly 11 includes the photographing optical lens assembly of the 1st embodiment and a lens barrel (not shown in drawings) for carrying the photographing optical lens assembly. The imaging apparatus 10 can focus light from an imaged object via the imaging lens assembly 11, perform image focusing by the driving apparatus 12, and generate an image on the image sensor 13, and the imaging information can be transmitted.

The driving apparatus 12 can be an auto-focus module, which can be driven by driving systems, such as voice coil motors (VCM), micro electro-mechanical systems (MEMS), piezoelectric systems, and shape memory alloys etc. The photographing optical lens assembly can obtain a favorable imaging position by the driving apparatus 12 so as to capture clear images when the imaged object is disposed at different object distances.

The imaging apparatus 10 can include the image sensor 13 located on the image surface of the photographing optical lens assembly, such as CMOS and CCD, with superior photosensitivity and low noise. Thus, it is favorable for providing realistic images with high definition image quality thereof.

Moreover, the imaging apparatus 10 can further include an image stabilization module 14, which can be a kinetic energy sensor, such as an accelerometer, a gyro sensor, and a Hall Effect sensor. In the 8th embodiment, the image stabilization module 14 is a gyro sensor, but is not limited thereto. Therefore, the variation of different axial directions of the photographing optical lens assembly can adjusted so as to compensate the image blur generated by motion at the moment of exposure, and it is further favorable for enhancing the image quality while photographing in motion and low light situation. Furthermore, advanced image compensation functions, such as optical image stabilizations (OIS) and electronic image stabilizations (EIS) etc., can be provided.

9th Embodiment

Figure 17A:
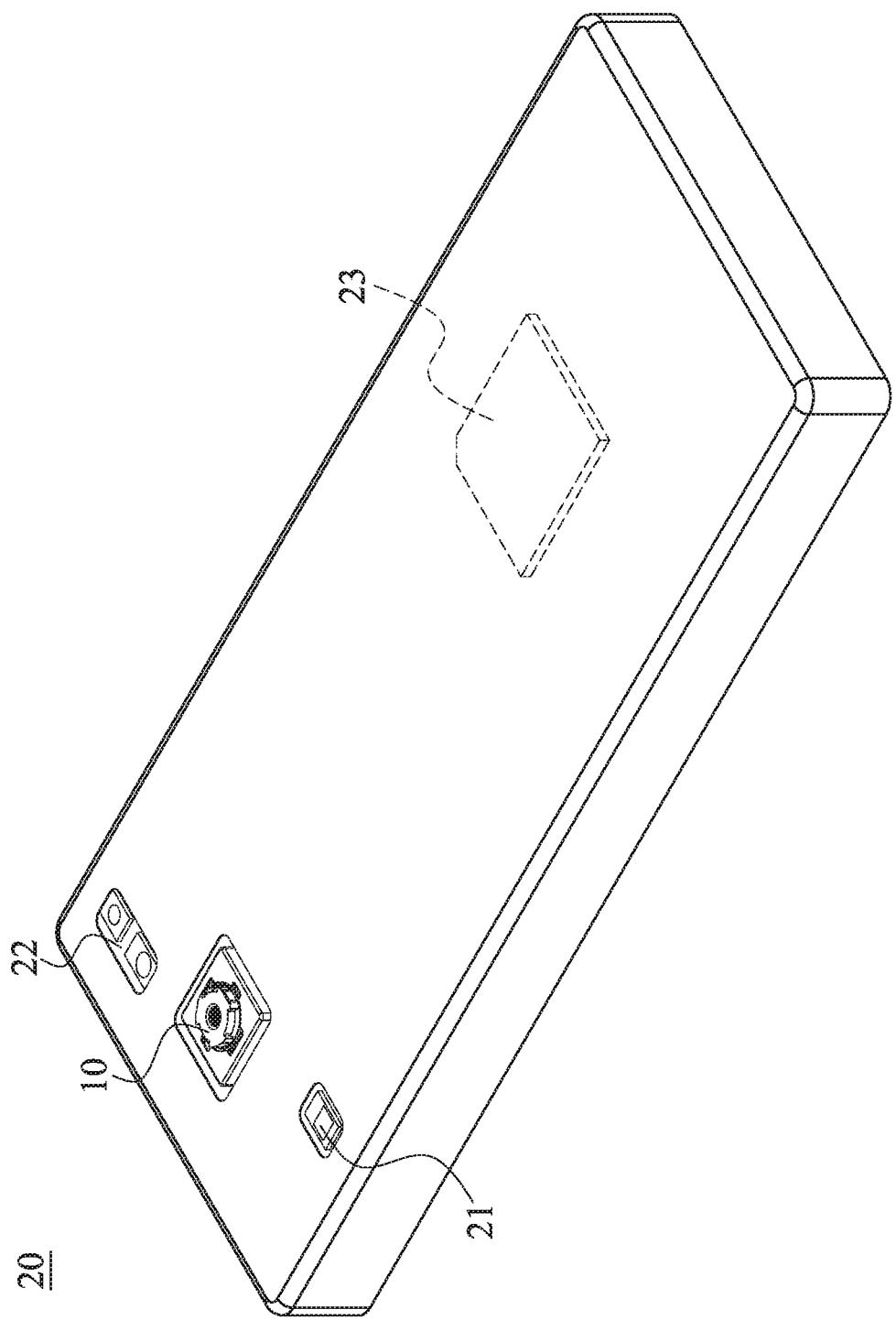
FIG. 17A is a schematic view of one side of an electronic device according to the 9th embodiment of the present disclosure.
Figure 17B:
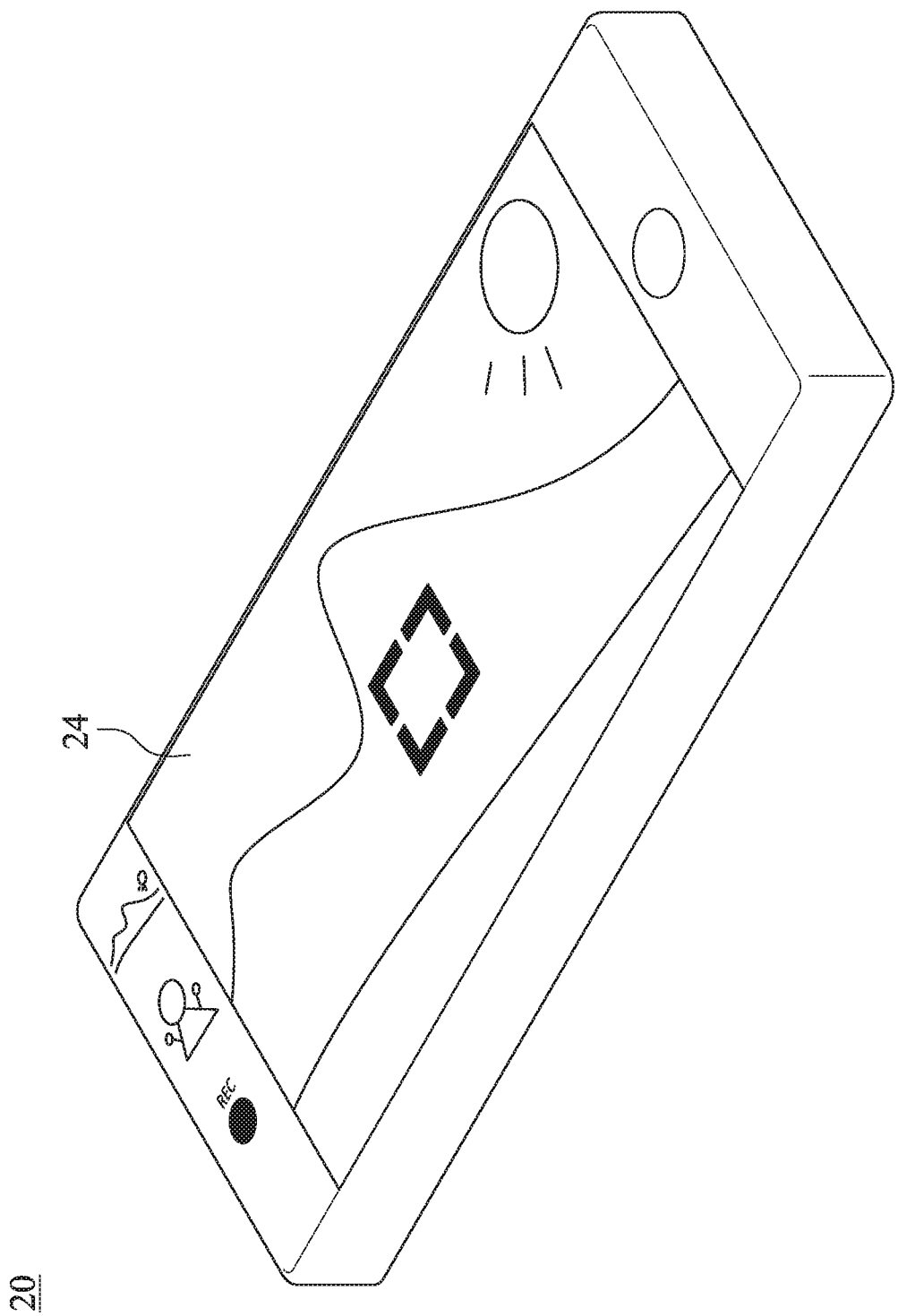
FIG. 17B is a schematic view of another side of the electronic device of FIG. 17A.
Figure 17C:
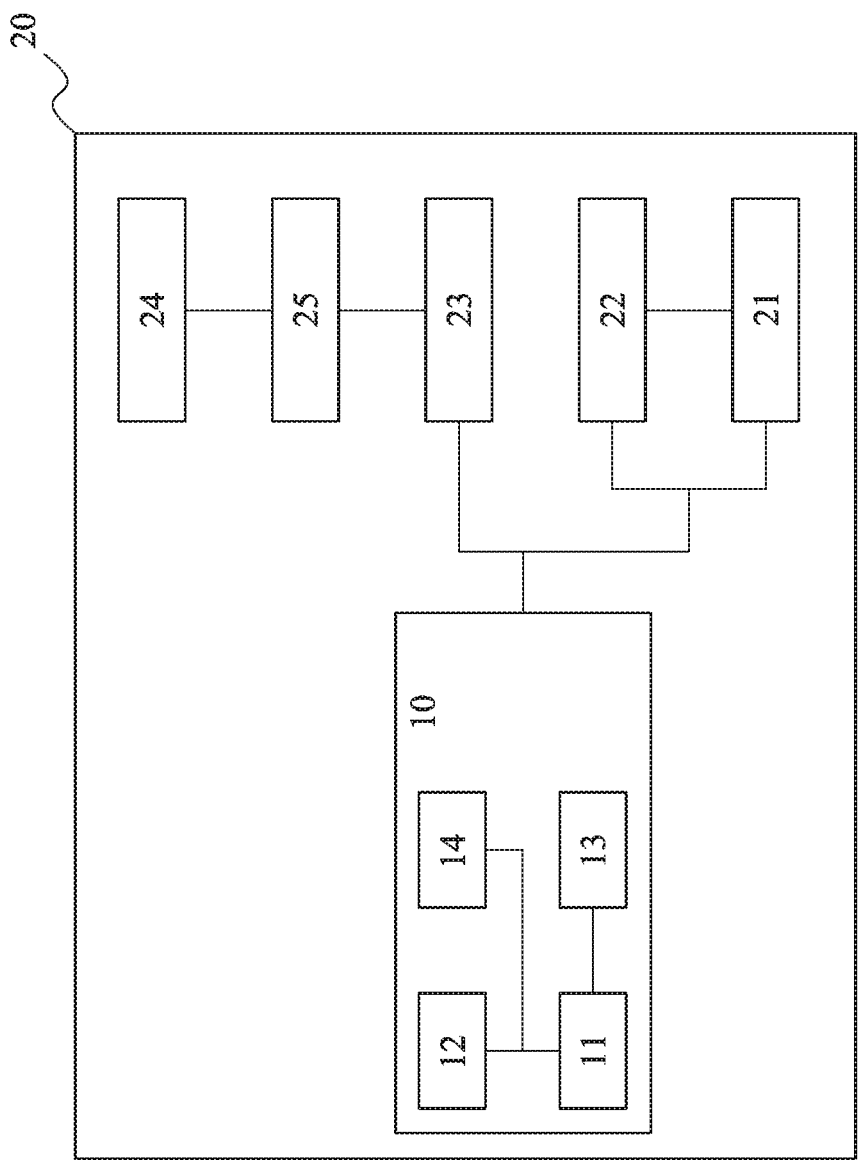
FIG. 17C is a system schematic view of the electronic device of FIG. 17A.

FIG. 17A is a schematic view of one side of an electronic device 20 according to the 9th embodiment of the present disclosure. FIG. 17B is a schematic view of another side of the electronic device 20 of FIG. 17A. FIG. 17C is a system schematic view of the electronic device 20 of FIG. 17A. In FIGS. 17A, 17B and 17C, the electronic device 20 according to the 9th embodiment is a smartphone, wherein the electronic device 20 includes an imaging apparatus 10, a flash module 21, a focusing assisting module 22, an image signal processor (ISP) 23, a user interface 24 and an image software processor 25. When the user captures images of an imaged object 26 via the user interface 24, the electronic device 20 focuses and generates an image via the imaging apparatus while compensating for low illumination via the flash module 21 when necessary. Then, the electronic device 20 quickly focuses on the imaged object according to its object distance information provided by the focusing assisting module 22, and optimizes the image via the image signal processor 23 and the image software processor 25. Thus, the image quality can be further enhanced. The focusing assisting module 22 can adopt conventional infrared or laser for obtaining quick focusing, and the user interface 24 can utilize a touch screen or a physical button for capturing and processing the image with various functions of the image processing software.

The imaging apparatus 10 according to the 9th embodiment is the same with the imaging apparatus 10 according to the 8th embodiment, and will not describe again herein.

10th Embodiment

Figure 18A:
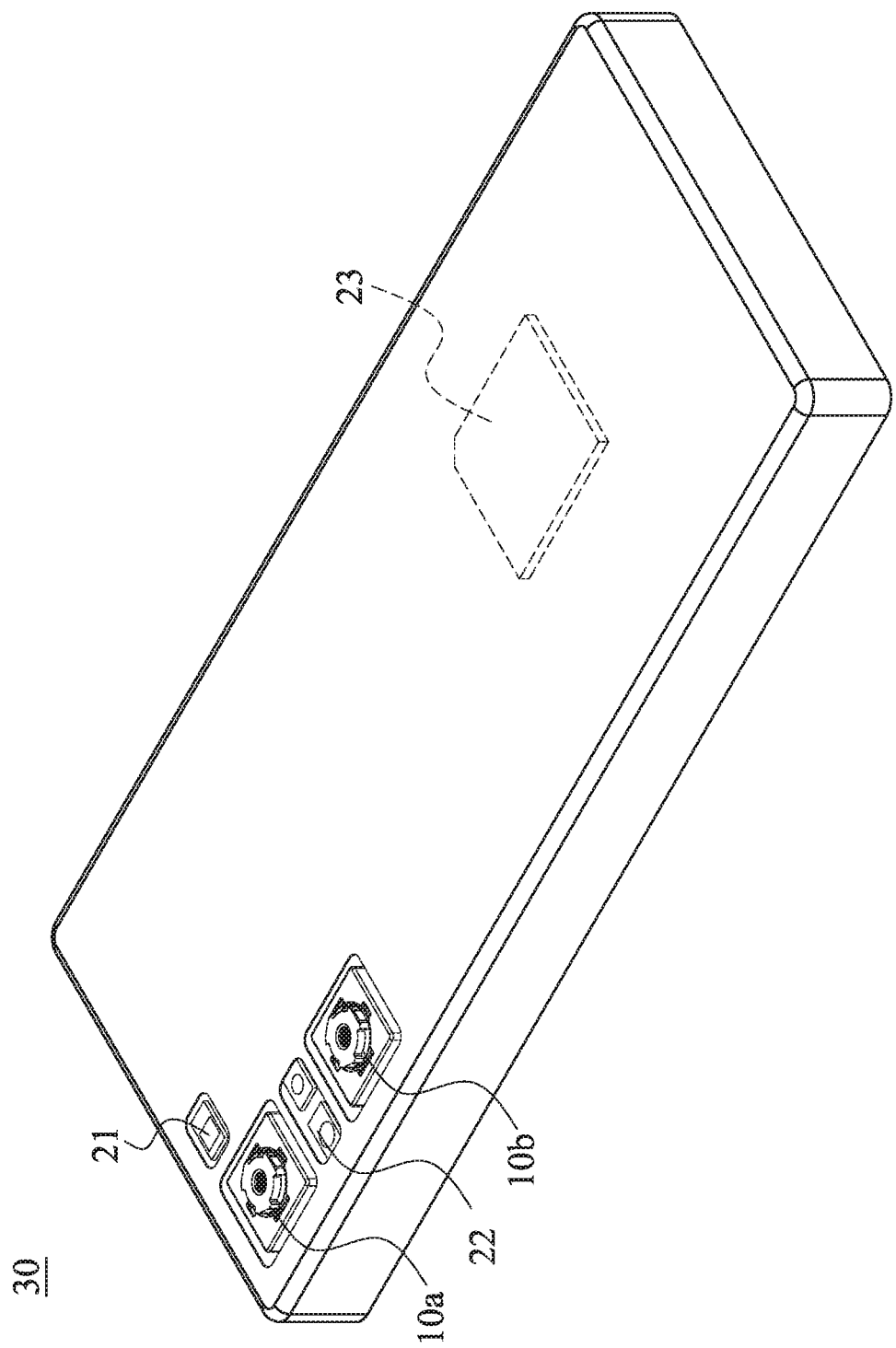
FIG. 18A is a schematic view of one side of an electronic device according to the 10th embodiment of the present disclosure.
Figure 18B:
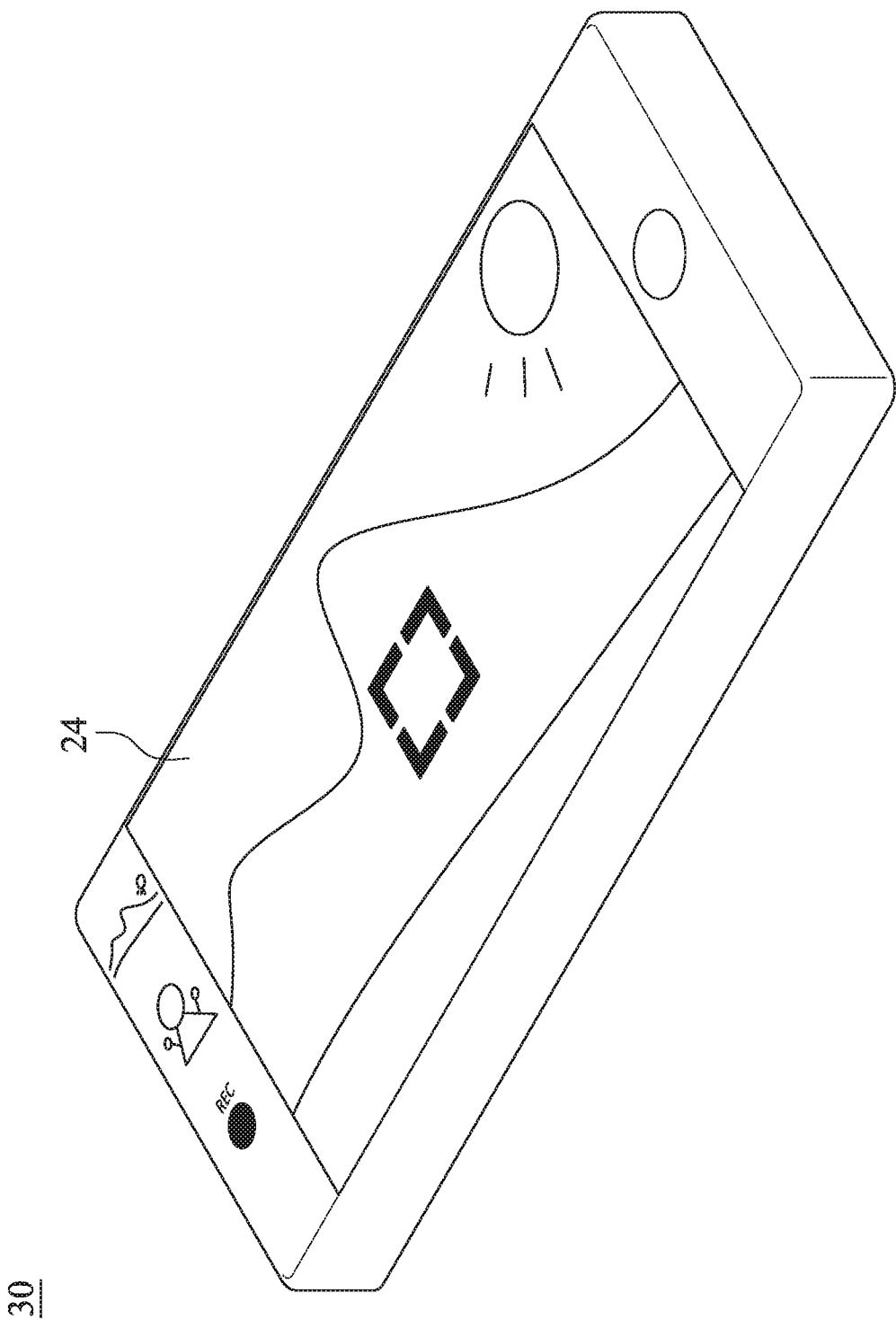
FIG. 18B is a schematic view of another side of the electronic device of FIG. 18A.
Figure 18C:
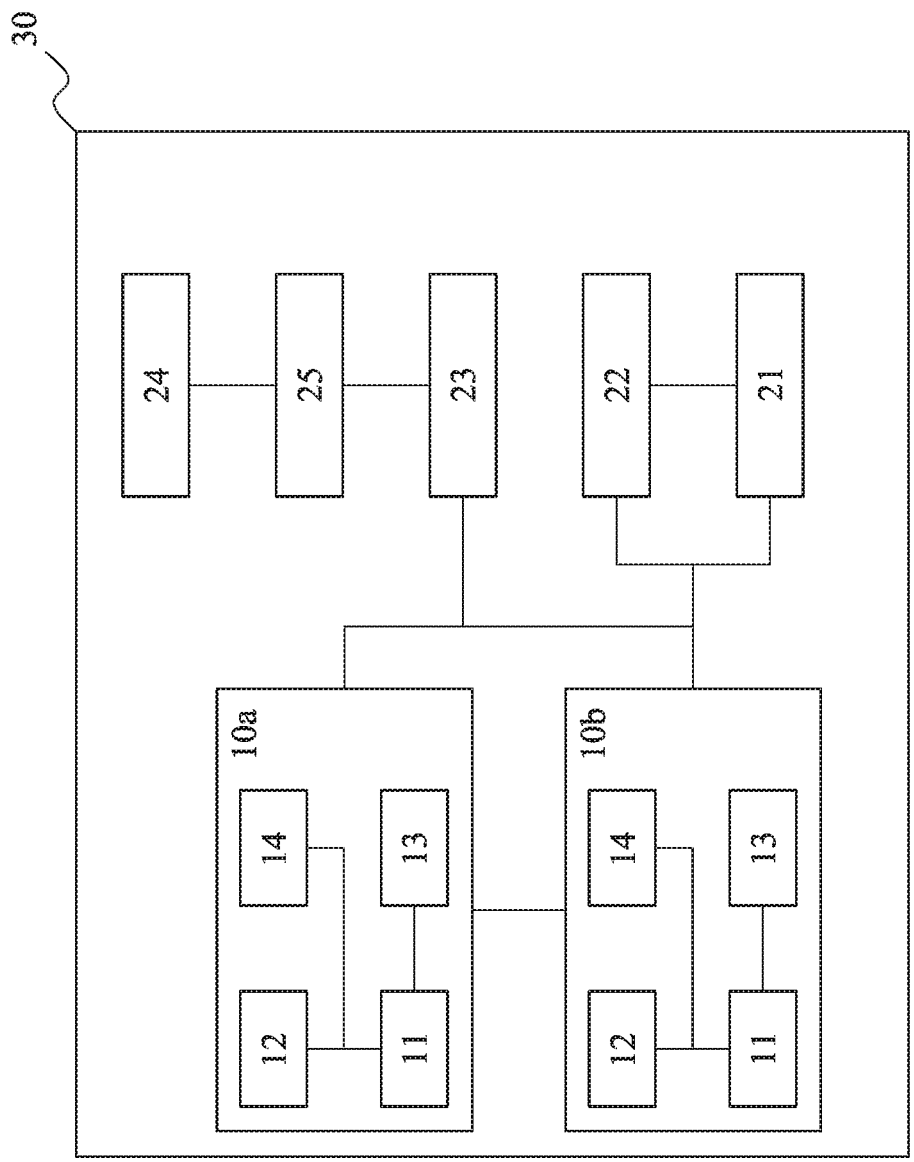
FIG. 18C is a system schematic view of the electronic device of FIG. 18A.

FIG. 18A is a schematic view of one side of an electronic device 30 according to the 10th embodiment of the present disclosure. FIG. 18B is a schematic view of another side of the electronic device 30 of FIG. 18A. FIG. 18C is a system schematic view of the electronic device 30 of FIG. 18A. In FIGS. 18A, 18B and 18C, the electronic device 30 according to the 10th embodiment is a smartphone, wherein the electronic device 30 includes two imaging apparatuses, a flash module 21, a focusing assisting module 22, an image signal processor (ISP) 23, a user interface 24 and an image software processor 25. When the user captures images of an imaged object 26 via the user interface 24, the electronic device 30 focuses and generates an image via the imaging apparatus while compensating for low illumination via the flash module 21 when necessary. Then, the electronic device 30 quickly focuses on the imaged object according to its object distance information provided by the focusing assisting module 22, and optimizes the image via the image signal processor 23 and the image software processor 25. Thus, the image quality can be further enhanced. The focusing assisting module 22 can adopt conventional infrared or laser for obtaining quick focusing, and the user interface 24 can utilize a touch screen or a physical button for capturing and processing the image with various functions of the image processing software.

According to the 10th embodiment, the two imaging apparatuses are a first imaging apparatus 10a and a second imaging apparatus 10b, which are both facing toward an object side. Each of the first imaging apparatus 10a and the second imaging apparatus 10b has a single focal point. Each of the first imaging apparatus 10a and the second imaging apparatus 10b has a field of view between 25 degrees and 60 degrees and between 70 degrees and 120 degrees, respectively. Hence, the applicability thereof can be enhanced.

Moreover, according to the 10th embodiment, each of the first imaging apparatus 10a and the second imaging apparatus 10b is the same as the imaging apparatus 10 according to the 8th embodiment (in FIG. 18C, the reference numeral of each element of each of the first imaging apparatus 10a and the second imaging apparatus 10b is the same with the corresponding element in FIG. 16), or the first imaging apparatus 10a can include a lens assembly which can be the same or different with the photographing optical lens assembly of the present disclosure, and will not describe again herein. Furthermore, the first imaging apparatus 10a can include a first image sensor which can be disposed on the image surface of the lens assembly or the optical photographing lens assembly, and the second imaging apparatus 10b can include a second image sensor which is disposed on the image surface of the optical photographing lens assembly, wherein the arrangement can be the same as the image sensor 13 of the imaging apparatus 10 according to the 8th embodiment. Thus, in the 10th embodiment, the reference numeral of each of the first image sensor and the second image sensor is corresponding to the reference numeral of the image sensor 13 in the 8th embodiment.

11th Embodiment

Figure 19B:
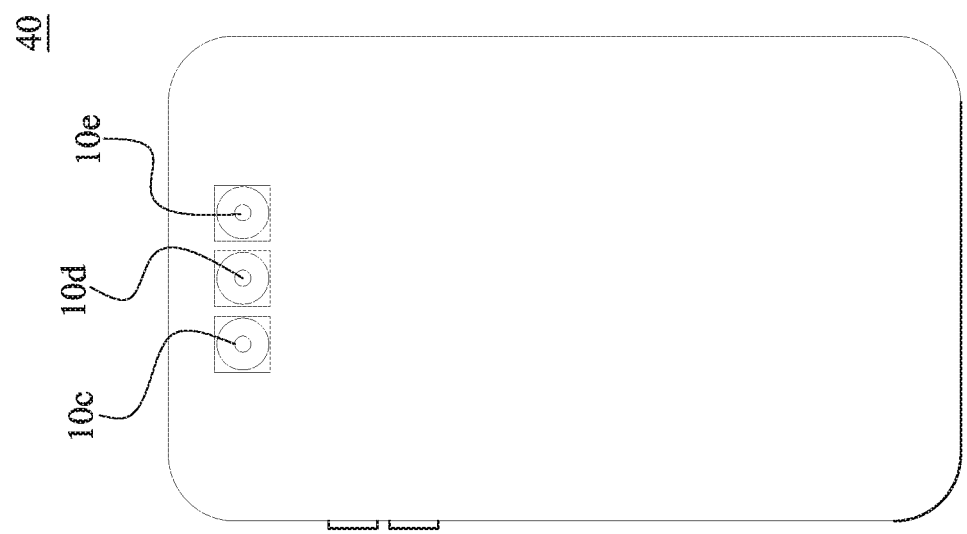
FIG. 19B is a schematic view of another side of the electronic device of FIG. 19A.
Figure 19A:
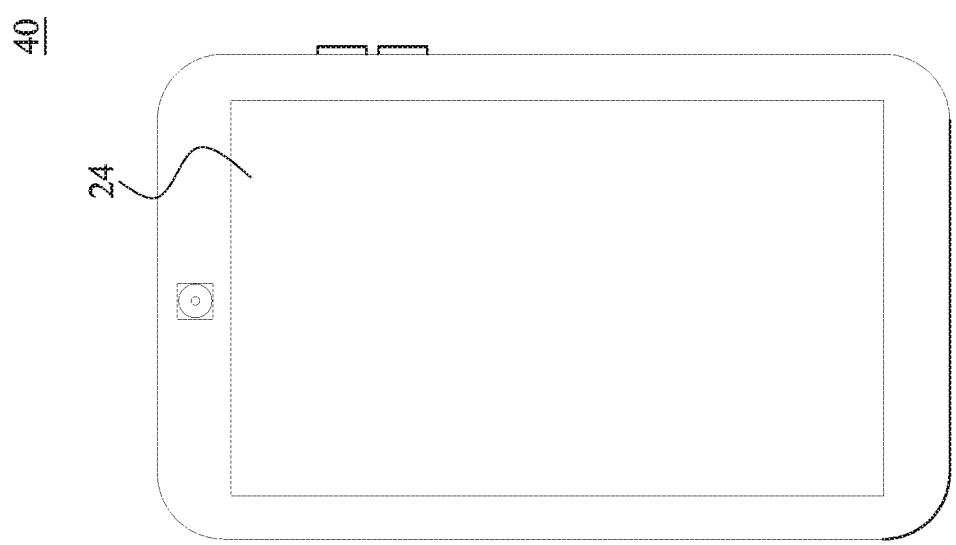
FIG. 19A is a schematic view of one side of an electronic device according to the 11th embodiment of the present disclosure.

FIG. 19A is a schematic view of one side of an electronic device 40 according to the 11th embodiment of the present disclosure. FIG. 19B is a schematic view of another side of the electronic device 40 of FIG. 19A. In FIGS. 19A and 19B, the electronic device 40 according to the 11th embodiment is a smartphone, wherein the electronic device 40 includes three imaging apparatus 10c, 10d, 10e, a flash module (its reference numeral is omitted), a focusing assisting module (its reference numeral is omitted), an image signal processor (its reference numeral is omitted), a user interface 24 and an image software processor (its reference numeral is omitted). As the description in the aforementioned 10th embodiment, when the user captures images of an imaged object (its reference numeral is omitted) via the user interface, the electronic device 40 focuses and generates an image via the imaging apparatus 10c, 10d, 10e while compensating for low illumination via the flash module when necessary. Then, the electronic device 40 quickly focuses on the imaged object according to its object distance information provided by the focusing assisting module, and optimizes the image via the image signal processor and the image software processor. Thus, the image quality can be further enhanced. The focusing assisting module can adopt conventional infrared or laser for obtaining quick focusing, and the user interface can utilize a touch screen or a physical button for capturing and processing the image with various functions of the image processing software.

The imaging apparatus 10c, 10d, 10e according to the 11th embodiment is the same as the imaging apparatus 10 according to the 9th embodiment, and will not describe again herein. In detail, in the 11th embodiment, the imaging apparatus 10c, 10d, 10e can be a telephoto imaging apparatus, a super-wide-angle imaging apparatus and an imaging apparatus with a wide angle (between the super-wide-angle and the telephoto), respectively, or can be others kind of imaging apparatus, and will not be limited thereto.

12th Embodiment

Figure 20:
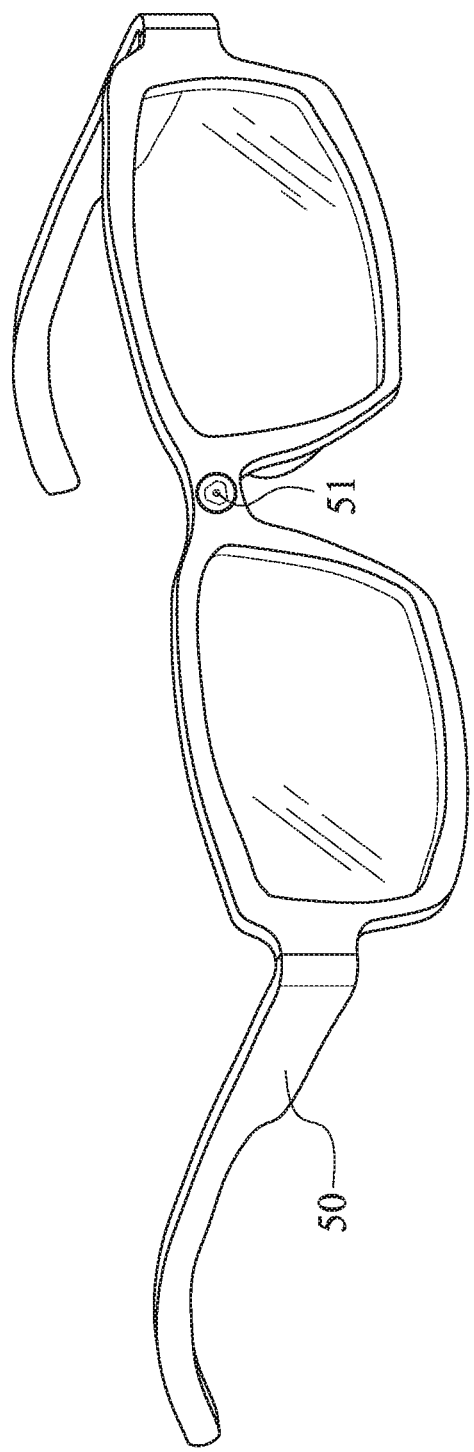
FIG. 20 is a schematic view of an electronic device according to the 12th embodiment of the present disclosure.

FIG. 20 is a schematic view of an electronic device 50 according to the 12th embodiment of the present disclosure. The electronic device 50 of the 12th embodiment is a wearable device, wherein the electronic device 50 includes an imaging apparatus 51, wherein the imaging apparatus 51 is the same as stated in the 9th embodiment, and will not describe again herein.

The foregoing description, for purpose of explanation, has been described with reference to specific embodiments. It is to be noted that Tables show different data of the different embodiments; however, the data of the different embodiments are obtained from experiments. The embodiments were chosen and described in order to best explain the principles of the disclosure and its practical applications, to thereby enable others skilled in the art to best utilize the disclosure and various embodiments with various modifications as are suited to the particular use contemplated. The embodiments depicted above and the appended drawings are exemplary and are not intended to be exhaustive or to limit the scope of the present disclosure to the precise forms disclosed. Many modifications and variations are possible in view of the above teachings.

What is claimed is:

1. A photographing optical lens assembly comprising seven lens elements, the seven lens elements being, in order from an object side to an image side: a first lens element, a second lens element, a third lens element, a fourth lens element, a fifth lens element, a sixth lens element and a seventh lens element;
   wherein the first lens element with positive refractive power has an object-side surface being convex in a paraxial region thereof and an image-side surface being concave in a paraxial region thereof;
   the second lens element has positive refractive power;
   the sixth lens element with positive refractive power has an image-side surface being convex in a paraxial region thereof; and
   the seventh lens element with negative refractive power has an image-side surface being concave in a paraxial region thereof and comprising at least one convex critical point in an off-axis region thereof;
   wherein a focal length of the photographing optical lens assembly is f, a focal length of the first lens element is f1, a focal length of the second lens element is f2, a focal length of the sixth lens element is f6, a curvature radius of an image-side surface of the fifth lens element is R10, an axial distance between the object-side surface of the first lens element and an image surface is TL, a maximum image height of the photographing optical lens assembly is ImgH, and the following conditions are satisfied:

$0.50 < |f1/f2| < 3.6;$ $0.375 < f/R10;$ $0.20 < f/f6;$ and $TL/\text{ImgH} < 1.75.$ 2. The photographing optical lens assembly of claim 1, wherein the focal length of the photographing optical lens assembly is f, an entrance pupil diameter of the photographing optical lens assembly is EPD, a maximum field of view of the photographing optical lens assembly is FOV, and the following conditions are satisfied:

$0.80<f/EPD<2.0$; and 70 degrees<FOV<140 degrees.

3. The photographing optical lens assembly of claim 1, wherein a curvature radius of an object-side surface of the sixth lens element is R11, a curvature radius of the image-side surface of the sixth lens element is R12, and the following condition is satisfied:

$0<(R11+R12)/(R11-R12)<4.0$.

4. The photographing optical lens assembly of claim 1, wherein an axial distance between the first lens element and the second lens element is T12, an axial distance between a maximum effective radius position on the image-side surface of the first lens element and a maximum effective radius position on an object-side surface of the second lens element is ET12, and the following condition is satisfied:

$0.70<T12/ET12$.

5. The photographing optical lens assembly of claim 1, wherein the third lens element with negative refractive power has an object-side surface being convex in a paraxial region thereof and an image-side surface being concave in a paraxial region thereof.

6. The photographing optical lens assembly of claim 1, wherein the focal length of the photographing optical lens assembly is f, a focal length of the third lens element is f3, a focal length of the fourth lens element is f4, a focal length of the fifth lens element is f5, and the following condition is satisfied:

$0.75<|f/f3|+|f/f4|+|f/f5|<3.60$.

7. The photographing optical lens assembly of claim 1, wherein a central thickness of the fourth lens element is CT4, a central thickness of the fifth lens element is CT5, and the following condition is satisfied:

$CT5/CT4<0.75$.

8. The photographing optical lens assembly of claim 1, wherein a curvature radius of the object-side surface of the first lens element is R1, a curvature radius of an object-side surface of the second lens element is R3, and the following condition is satisfied:

$|R1|/R3<1.33$.

9. The photographing optical lens assembly of claim 1, wherein a central thickness of the first lens element is CT1, a central thickness of the second lens element is CT2, and the following condition is satisfied:

$0.80<CT2/CT1$.

10. The photographing optical lens assembly of claim 1, wherein the focal length of the first lens element is f1, the focal length of the second lens element is f2, and the following condition is satisfied:

$0.60<|f1/f2|<1.90$.

11. The photographing optical lens assembly of claim 1, wherein a sum of central thicknesses of all lens elements of the photographing optical lens assembly is ΣCT, a sum of all axial distances between adjacent lens elements of the photographing optical lens assembly is ΣAT, a maximum refractive index of a lens element of the optical photographing lens assembly is Nmax, and the following conditions are satisfied:

$1.0<\Sigma CT/\Sigma AT$; and $1.650 \leq Nmax<1.720$.

12. The photographing optical lens assembly of claim 1, wherein the focal length of the photographing optical lens assembly is f, a focal length of the sixth lens element is f6, a focal length of the seventh lens element is f7, and the following condition is satisfied:

$2.0<|f/f6|-4/f7|<6.0$.

13. The photographing optical lens assembly of claim 1, wherein an Abbe number of the third lens element is V3, an Abbe number of the fourth lens element is V4, an Abbe number of the fifth lens element is V5, and the following condition is satisfied:

$40<V3+V4+V5<120$.

14. The photographing optical lens assembly of claim 1, wherein a focal length of the fourth lens element is f4, a focal length of the fifth lens element is f5, a focal length of the sixth lens element is f6, a focal length of the seventh lens element is f7, and the following conditions are satisfied:

$|f7/f6|<1.0$;

$|f6/f4|<1.0$; and $|f6/f5|<1.0$.

15. The photographing optical lens assembly of claim 1, wherein a central thickness of the second lens element is CT2, a central thickness of the third lens element is CT3, a central thickness of the fifth lens element is CT5, a central thickness of the sixth lens element is CT6, and the following condition is satisfied:

$1.75<(CT2+CT6)/(CT3+CT5)$.

16. The photographing optical lens assembly of claim 1, wherein the focal length of the first lens element is f1, the focal length of the second lens element is f2, a focal length of the third lens element is f3, and the following conditions are satisfied:

$|f2/f3|<1.0$; and $|f3/f1|<1.0$.

17. The photographing optical lens assembly of claim 1, wherein the axial distance between the object-side surface of the first lens element and the image surface is TL, an entrance pupil diameter of the photographing optical lens assembly is EPD, and the following condition is satisfied:

$1.40<TL/EPD<2.75$.

18. An imaging apparatus, comprising:
the photographing optical lens assembly of claim 1; and
an image sensor disposed on the image surface of the photographing optical lens assembly.

19. An electronic device, comprising:
the imaging apparatus of claim 18.

20. A photographing optical lens assembly comprising seven lens elements, the seven lens elements being, in order from an object side to an image side: a first lens element, a second lens element, a third lens element, a fourth lens element, a fifth lens element, a sixth lens element and a seventh lens element;

wherein the first lens element with positive refractive power has an object-side surface being convex in a paraxial region thereof;
the second lens element has positive refractive power;
the sixth lens element with positive refractive power has an image-side surface being convex in a paraxial region thereof; and
the seventh lens element with negative refractive power has an image-side surface being concave in a paraxial region thereof and comprising at least one convex critical point in an off-axis region thereof;
wherein a focal length of the photographing optical lens assembly is f, a focal length of the first lens element is f1, a focal length of the second lens element is f2, a focal length of the sixth lens element is f6, a curvature radius of the object-side surface of the first lens element is R1, a curvature radius of an object-side surface of the second lens element is R3, a curvature radius of an image-side surface of the fifth lens element is R10, an axial distance between the object-side surface of the first lens element and an image surface is TL, a maximum image height of the photographing optical lens assembly is ImgH, and the following conditions are satisfied:

$0.50 < |f1/f2| < 5.5$;

$0.375 < f/R10$;

$0.20 < f/f6$;

$0.80 < TL/ImgH < 1.55$; and $|R1|/R3 < 1.33$.

21. The photographing optical lens assembly of claim 20, wherein the focal length of the photographing optical lens assembly is f, the curvature radius of the image-side surface of the fifth lens element is R10, and the following condition is satisfied:

$0.55 < f/R10 < 3.0$.

22. The photographing optical lens assembly of claim 20, wherein the third lens element with negative refractive power has an object-side surface being convex in a paraxial region thereof and an image-side surface being concave in a paraxial region thereof.

23. The photographing optical lens assembly of claim 20, wherein a total number of the lens elements having Abbe numbers less than 20 is V20, and the following condition is satisfied:

$1 \leq V20$.

24. The photographing optical lens assembly of claim 20, wherein the curvature radius of the object-side surface of the first lens element is R1, the curvature radius of the object-side surface of the second lens element is R3, and the following condition is satisfied:

$|R1|/R3 < 1.0$.

25. The photographing optical lens assembly of claim 20, wherein the focal length of the first lens element is f1, the focal length of the second lens element is f2, and the following condition is satisfied:

$1.0 < |f1/f2| < 3.0$.

26. The photographing optical lens assembly of claim 20, wherein the axial distance between the object-side surface of the first lens element and the image surface is TL, an entrance pupil diameter of the photographing optical lens assembly is EPD, and the following condition is satisfied:

$1.40 < TL/EPD < 2.75$.

27. An electronic device, comprising at least two imaging apparatuses, the at least two imaging apparatuses comprising:
a first imaging apparatus and a second imaging apparatus, wherein the first imaging apparatus and the second imaging apparatus are both facing toward an object side, each of the first imaging apparatus and the second imaging apparatus has a single focal point;
wherein the first imaging apparatus comprises a lens assembly and a first image sensor, the first image sensor is disposed on an image surface of the lens assembly, and the first imaging apparatus has a field of view between 25 degrees and 60 degrees;
wherein the second imaging apparatus comprises the photographing optical lens assembly of claim 20 and a second image sensor, the second image sensor is disposed on the image surface of the photographing optical lens assembly, and the second imaging apparatus has a field of view between 70 degrees and 120 degrees.

* * * * *

UNITED STATES PATENT AND TRADEMARK OFFICE
CERTIFICATE OF CORRECTION

PATENT NO. : 11,016,270 B2
APPLICATION NO. : 16/295633
DATED : May 25, 2021
INVENTOR(S) : Hsiang-Chi Tang et al.

Page 1 of 1

It is certified that error appears in the above-identified patent and that said Letters Patent is hereby corrected as shown below:

In the Claims (1) In Column 40, Line 13, please delete "$2.0<|f/f6|-4/f7<6.0$", and insert therefor --$2.0<|f/f6|+|f/f7|<6.0$--.

(2) In Column 41, Line 25, please delete "$0.5<f1/f2|<5.5$", and insert therefor --$0.5<|f1/f2|<5.5$--.

Signed and Sealed this
Twenty-fourth Day of August, 2021

Drew Hirshfeld
*Performing the Functions and Duties of the
Under Secretary of Commerce for Intellectual Property and
Director of the United States Patent and Trademark Office*